United States Patent
Komatsu

(10) Patent No.: US 9,674,272 B2
(45) Date of Patent: Jun. 6, 2017

(54) INFORMATION PROCESSING APPARATUS AND METHOD, AND PROGRAM

(71) Applicant: SONY CORPORATION, Tokyo (JP)

(72) Inventor: Hirokazu Komatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 243 days.

(21) Appl. No.: 14/350,330

(22) PCT Filed: Oct. 5, 2012

(86) PCT No.: PCT/JP2012/075918
§ 371 (c)(1),
(2) Date: Apr. 7, 2014

(87) PCT Pub. No.: WO2013/054747
PCT Pub. Date: Apr. 18, 2013

(65) Prior Publication Data
US 2014/0258362 A1    Sep. 11, 2014

(30) Foreign Application Priority Data
Oct. 13, 2011    (JP) .................................. 2011-225476

(51) Int. Cl.
*H04L 29/08*    (2006.01)
*G06Q 20/32*    (2012.01)
(Continued)

(52) U.S. Cl.
CPC ............... *H04L 67/10* (2013.01); *G06F 8/65* (2013.01); *G06Q 20/204* (2013.01); *G06Q 20/32* (2013.01);
(Continued)

(58) Field of Classification Search
CPC ............. H04L 2209/56; H04L 2209/80; H04L 63/0823; H04L 63/08; G06Q 20/204; G06Q 20/3278; G06Q 20/20; G06Q 20/32
See application file for complete search history.

(56) References Cited

U.S. PATENT DOCUMENTS

| 8,196,131 B1 * | 6/2012 | von Behren | ......... G06Q 20/367 705/64 |
| 2011/0112968 A1 * | 5/2011 | Florek | .................... G06Q 20/20 705/50 |

FOREIGN PATENT DOCUMENTS

| JP | 11-203433 | 7/1999 |
| JP | 2001-067226 | 3/2001 |
| JP | 2008-306736 | 12/2008 |

* cited by examiner

*Primary Examiner* — Chirag R Patel
(74) *Attorney, Agent, or Firm* — Haug Partners LLP; William S. Frommer

(57) ABSTRACT

The present technique relates to an information processing apparatus and method and a program that can easily handle replacement of an apparatus. First application creating means creates a first application that controls a device of another information processing apparatus communicating with an IC card, and first domain creating means allows another information processing apparatus to create a first domain where the first application is to be registered. First application registering means allows the first application to be registered in the first domain of another information processing apparatus. Writing means allows the first application to be written into an execution area of another information processing apparatus, and second application creating means creates a second application that performs a process for the IC card. Second domain creating means allows another information processing apparatus to create a second domain where the second application is to be regis- (Continued)

tered, and second application registering means allows the second application to be registered in the second domain of another information processing apparatus.

16 Claims, 16 Drawing Sheets

(51) Int. Cl.
    *H04L 29/06*     (2006.01)
    *G06Q 20/20*     (2012.01)
    *G06F 9/445*     (2006.01)

(52) U.S. Cl.
    CPC ..... *G06Q 20/3278* (2013.01); *H04L 63/0823* (2013.01)

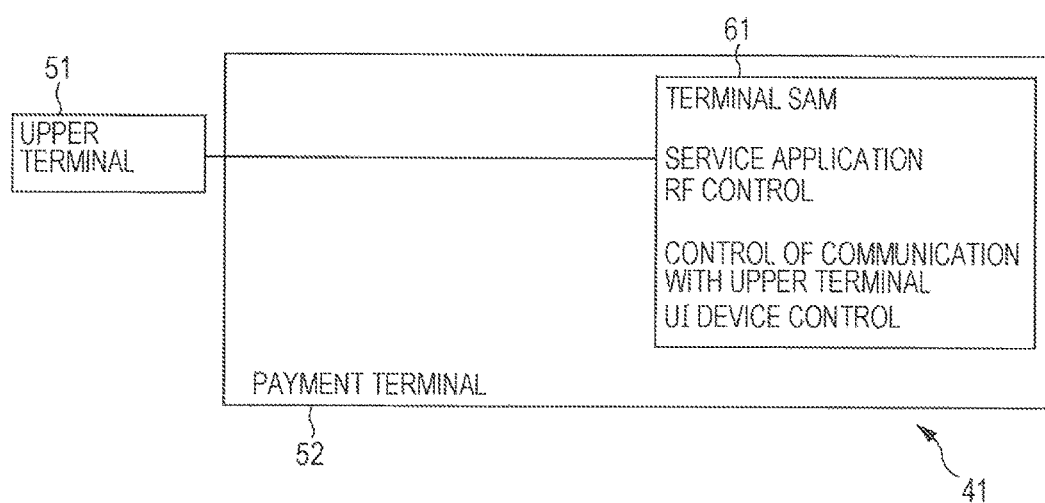

INFORMATION PROCESSING APPARATUS AND METHOD, AND PROGRAM

TECHNICAL FIELD

The present technique relates to an information processing apparatus and method and a program, and more particularly to an information processing apparatus and method and a program that allow to easily handle replacement of an apparatus.

BACKGROUND ART

FIG. 1 is a block diagram showing a configuration of a conventional payment system 1. The payment system 1 is composed of an upper terminal 11 composed of a register of a POS (Point of Sales) system or the like; and a payment terminal 12. The payment terminal 12 is composed of a terminal for user interface (UI) control 21 and a terminal SAM 22.

The terminal SAM 22 performs a payment process with an IC card (not shown), based on a service application included therein. Therefore, the terminal SAM 22 performs RF (Radio Frequency) control for communication with the IC card, and control of communication with the UI control terminal 21.

The terminal for UI control 21 performs control of communication with the terminal SAM 22 and control of communication with the upper terminal 11, in addition to control of UI devices such as a display device (not shown).

Control of communication with the terminal SAM 22 is performed according to a protocol defined by firmware of the payment terminal 12. On the other hand, control of communication with the upper terminal 11 is performed according to a protocol defined by the upper terminal 11.

As a result, for example, when the terminal SAM 22 or the upper terminal 11 is replaced with one from a different manufacturer, there is a need to readjust the communication protocol.

Patent Document 1 proposes that a relay module is provided to each client device, and the client devices communicate mutually using their relay modules, through a dedicated server arranged on the Internet.

Application of the technique of Patent Document 1 to the payment system 1 is considered.

CITATION LIST

Patent Document

Patent Document 1: JP 2008-306736 A

SUMMARY OF THE INVENTION

Problems to be Solved by the Invention

In the technique of Patent Document 1, a common protocol is implemented by allowing client devices to have a common apparatus, called a relay module, by which many client devices can be mutually connected through the Internet. However, in the payment system 1 composed of the terminal SAM 22 and the upper terminal 11, when an apparatus in the payment system 1 is replaced with one from a different manufacturer and thus the protocol needs to be changed, application of the technique of Patent Document 1 results in high cost, making it difficult to easily replace the apparatus.

The present technique is made in view of such circumstances, and is to allow to easily handle replacement of an apparatus.

Solutions to Problems

One aspect of the present technique is directed to an information processing apparatus including: first application creating means for creating a first application that controls a device of another information processing apparatus communicating with an IC card; first domain creating means for allowing the another information processing apparatus to create a first domain where the first application is to be registered; first application registering means for allowing the first application to be registered in the first domain of the another information processing apparatus; writing means for allowing the first application to be written into an execution area of the another information processing apparatus; second application creating means for creating a second application that performs a process for the IC card; second domain creating means for allowing the another information processing apparatus to create a second domain where the second application is to be registered; and second application registering means for allowing the second application to be registered in the second domain of the another information processing apparatus.

Each of commands for the creation of the first domain, the registration in the first domain, the writing into the execution area, the creation of the second domain, and the registration in the second domain can be transmitted to the another information processing apparatus, as an encrypted package.

The writing means can allow the first application to be written into the execution area for the first application formed in a different memory than a memory where an execution area for the second application is formed.

The information processing apparatus can further include validating means for validating the first application.

In a case of the first application validated, the first application can be activated when the another information processing apparatus is activated.

The first application can have a higher priority than firmware of the another information processing apparatus.

The information processing apparatus can be a POS terminal, and the another information processing apparatus can be an IC card reader/writer.

An information processing method and program of one aspect of the present technique are a method and a program for the information processing apparatus of the above-described one aspect of the present technique.

Another aspect of the present technique is directed to an information processing apparatus including: first domain creating means for creating a first domain where a first application is to be registered, based on an instruction from another information processing apparatus, the first application controlling a device; first application registering means for registering the first application in the first domain, based on an instruction from the another information processing apparatus, the first application being received from the another information processing apparatus; writing means for writing the first application into an execution area, based on an instruction from the another information processing apparatus; second domain creating means for creating a second domain where a second application is to be registered, based on an instruction from the another information processing apparatus, the second application performing a process for an IC card; and second application registering means for registering the second application in the second domain, based on an instruction from the another information processing apparatus, the second application being received from the another information processing apparatus.

The writing means can write the first application into the execution area for the first application formed in a different memory than a memory where an execution area for the second application is formed.

The information processing apparatus further includes storage means for storing validation information indicating that the first application has been validated by the another information processing apparatus, and when the first application is validated, the first application can be activated when the information processing apparatus is activated.

The first application can have a higher priority than firmware of the information processing apparatus.

The information processing apparatus can be an IC card reader/writer, and the another information processing apparatus can be a POS terminal.

An information processing method and program of another aspect of the present technique are a method and a program for the information processing apparatus of the above-described another aspect of the present technique.

In one aspect of the present technique, a first application that controls a device of another information processing apparatus communicating with an IC card is created, and a first domain where the first application is to be registered is created in another information processing apparatus. Furthermore, the first application is registered in the first domain of another information processing apparatus. The first application is written into an execution area of another information processing apparatus. A second application that performs a process for the IC card is created, and a second domain where the second application is to be registered is created in another information processing apparatus. Then, the second application is registered in the second domain of another information processing apparatus.

In another aspect of the present technique, a first domain where a first application that controls a device is to be registered is created based on an instruction from another information processing apparatus, and the first application received from another information processing apparatus is registered in the first domain, based on an instruction from another information processing apparatus. Furthermore, the first application is written into an execution area, based on an instruction from another information processing apparatus. In addition, a second domain where a second application that performs a process for an IC card is to be registered is created based on an instruction from another information processing apparatus, and the second application received from another information processing apparatus is registered in the second domain based on an instruction from another information processing apparatus.

Effects of the Invention

As described above, according to the aspects of the present technique, replacement of an apparatus can be easily handled.

BRIEF DESCRIPTION OF DRAWINGS

FIG. 22 is a block diagram showing a configuration of a terminal SAM client.

MODES FOR CARRYING OUT THE INVENTION

Figure 1:
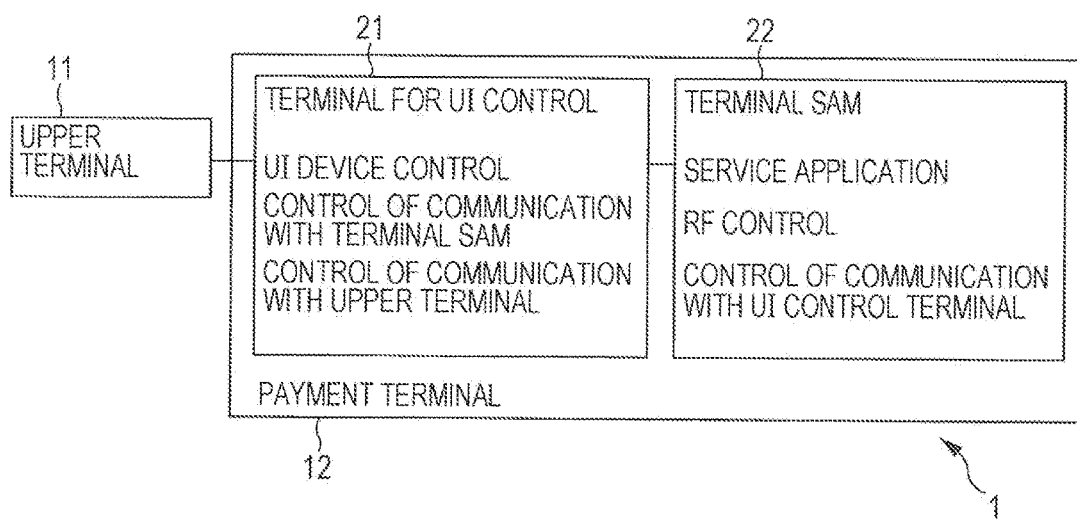
FIG. 1 is a block diagram showing a configuration of a conventional payment system.

The present technique will be described below in the following order.
1 Configuration of an information processing system
2 Configuration of a terminal SAM client
3 Hardware configuration of a terminal SAM
4 Software configuration of the terminal SAM
5 Functional configuration of an upper terminal
6 Functional configuration of the terminal SAM
7 Application registration process
8 System power activation process
9 Configurations of an MC application and a service application
10 Payment service process
11 Configuration of a payment system
12 Application of the present technique to a program
13. Others A mode for carrying out the technique (hereinafter, referred to as the embodiment) will be described below.

[Configuration of an Information Processing System]

Figure 2:
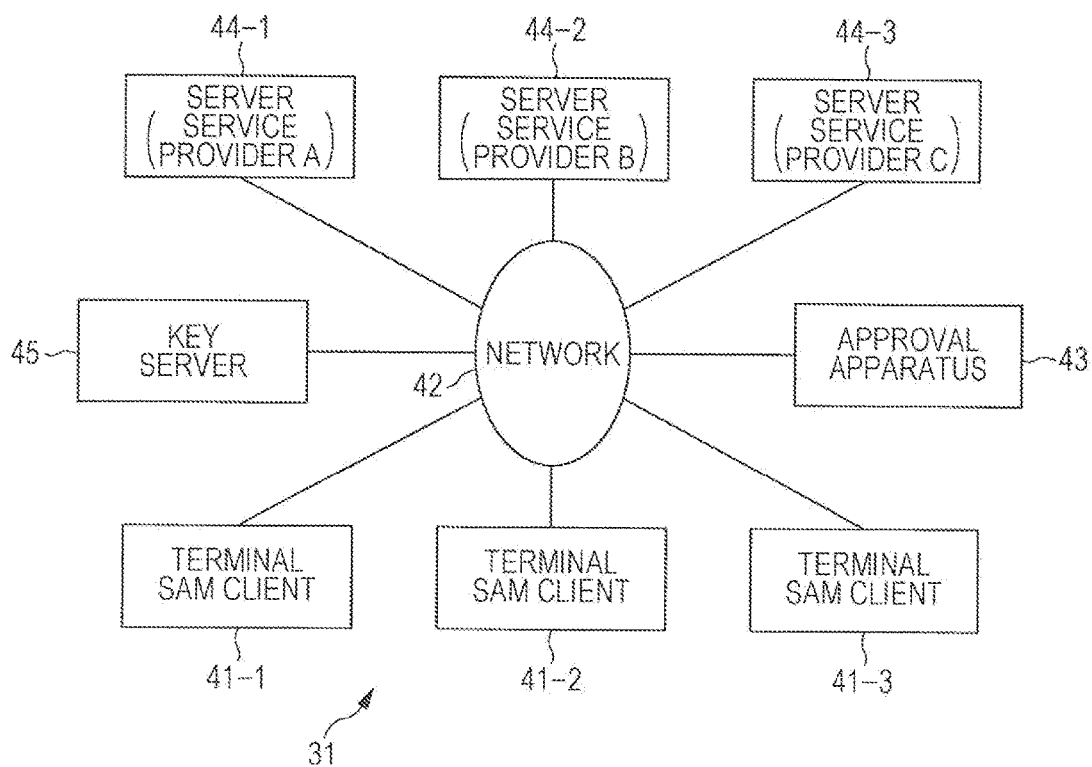
FIG. 2 is a block diagram showing a configuration of one embodiment of an information processing system of the present technique.

FIG. 2 is a diagram showing an exemplary overall configuration of an information processing system to which the present technique is applied. This information processing system 31 functioning as a payment system is composed of terminal SAM (Secure Application Module) clients 41-1 to 41-3, a network 42, an approval apparatus 43, servers 44-1 to 44-3, and a key server 45.

Each of the terminal SAM clients 41-1 to 41-3 is connected to the network 42. In addition, the approval apparatus 43, the servers 44-1 to 44-3, and the key server 45 are connected to the network 42.

The server 44-1 is run by a service provider A, the server 44-2 is run by a service provider B, and the server 44-3 is run by a service provider C. Namely, the servers 44-1 to 44-3 are run by different service providers and provide different services. The network 42 is composed of, for example, a LAN (Local Area Network), the Internet, or the like. The key server 45 which is a server intensively managing keys for giving and receiving information to and from IC cards is co-run by the service providers A, B, and C. Namely, key data for services managed by the servers 44-1 to 44-3 is collectively managed by the key server 45. When the servers 44-1 to 44-3 update keys, the servers 44-1 to 44-3 register key data in the key server 45 through the network 42. The approval apparatus 43 is an apparatus managed by a predetermined approval organization. In practice, various types of processes are performed by the approval apparatus 43. That is, the processes by the approval apparatus 43 are performed by the approval organization.

Note that in the following, when the terminal SAM clients 41-1 to 41-3 do not need to be individually distinguished, they are simply referred to as the terminal SAM client(s) 41, and when the servers 44-1 to 44-3 do not need to be individually distinguished, they are simply referred to as the server(s) 44. Note also that, when the service providers A, B, and C do not need to be individually distinguished, they are referred to as the service provider(s). The same also applies to other components.

The approval apparatus 43 is an organization that approves a terminal SAM client 41 for a service provider. For example, in response to a request from a terminal SAM client 41, the approval apparatus 43 issues an application's digital certificate (a certificate for an application of the terminal SAM client 41 by the approval apparatus 43) to the application of the terminal SAM client 41.

Figure 3:
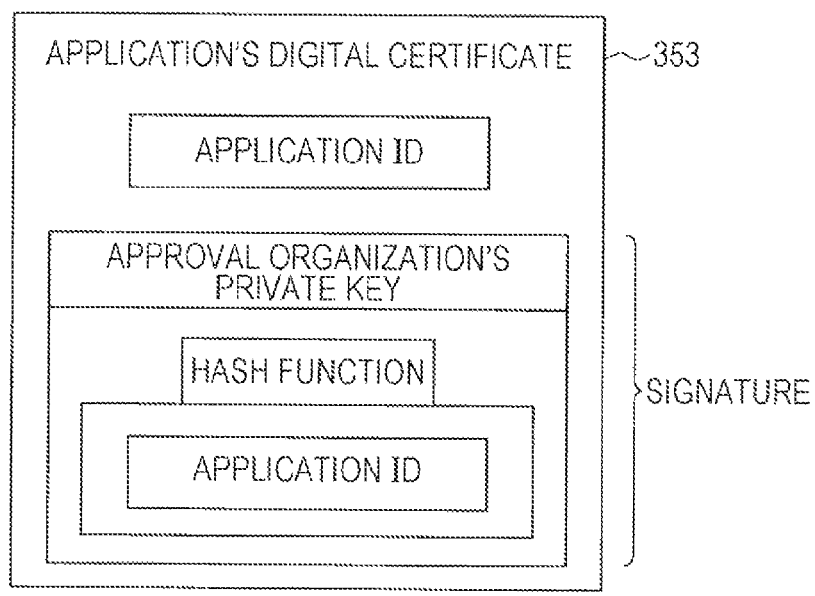
FIG. 3 is a diagram showing an example of an application's digital certificate.

FIG. 3 is a diagram showing an example of an application's digital certificate 353. The application's digital certificate 353 is composed of an application ID that identifies an application; and a signature thereof. The terminal SAM client 41 reads an application ID registered therein. The application ID is plaintext.

The application ID is transmitted to the approval apparatus 43. The approval apparatus 43 compresses the application ID using a hash function. The approval apparatus 43 further encrypts the compressed result by the approval organization's private key, and thereby obtains a signature. The approval apparatus 43 combines the application ID and the signature as a pair, and thereby creates an application's digital certificate 353. The application's digital certificate 353 is transmitted from the approval apparatus 43 to the terminal SAM client 41.

Each application of the terminal SAM client 41 transmits a digital certificate for the application to the key server 45, and the key server 45 receives the digital certificate for the application. The key server 45 verifies by the public key of the approval apparatus 43 whether the digital certificate for the application is valid. If the digital certificate is verified to be valid, the key server 45 issues an access authorization and transmits the access authorization to the application of the terminal SAM client 41. The application of the terminal SAM client 41 obtains key data, as necessary, from the key server 45 using the access authorization. In addition, the terminal SAM client 41 accepts distribution of the application and other information from a corresponding server 44, as necessary.

The key server 45 can determine based on the access authorization from the application of the terminal SAM client 41 whether key data is to be distributed to the application of the terminal SAM client 41. When authentication of the application of the terminal SAM client 41 is succeeded based on the access authorization from the application of the terminal SAM client 41, the key server 45 transmits key data to the application of the terminal SAM client 41.

The terminal SAM client 41 can execute a plurality of applications. In addition, the terminal SAM client 41 executes an application to access an IC card 71 (see FIG. 4 which will be described later). At this time, the application uses key data as a secret key for exchanging information with the IC card 71. For example, the terminal SAM client 41 executes an application to update data in the IC card 71. Then, the application of the terminal SAM client 41 transmits a process execution result, an inquiry or the like, to a server 44 providing a corresponding service, through the network 42. Note that, when the network 42 is offline, the application of the terminal SAM client 41 holds the process execution result, and transmits the execution result to the server 44 through the network 42 when the network 42 goes online. Note that although the embodiment describes the transmission through the network 42, the network 42 does not need to be used.

[Configuration of a Terminal SAM Client]

Figure 4:
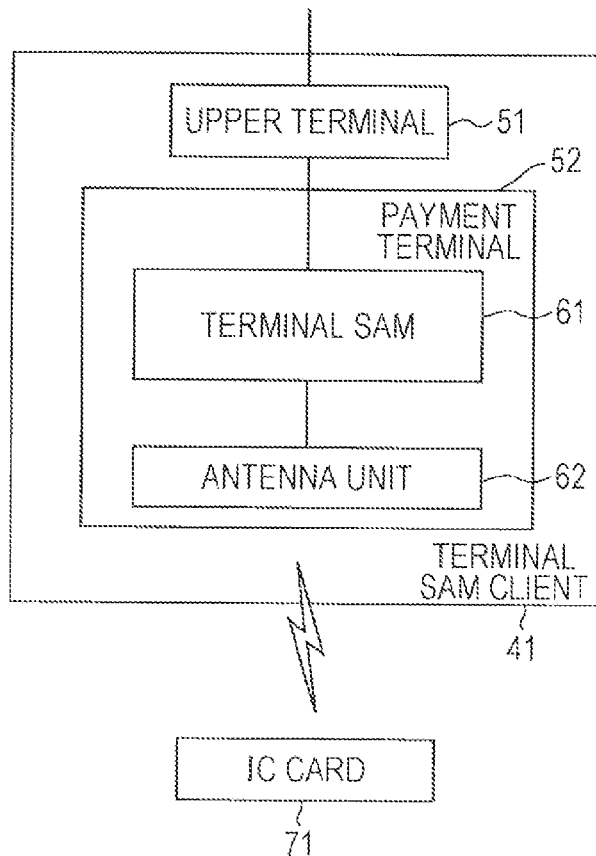
FIG. 4 is a block diagram showing a configuration of a terminal SAM client.

Next, an exemplary functional configuration of the terminal SAM client 41 will be described. FIG. 4 is a block diagram showing an exemplary functional configuration of the terminal SAM client 41 of FIG. 2.

The terminal SAM client 41 is composed of an upper terminal 51 and a payment terminal 52, and the payment terminal 52 is composed of a terminal SAM 61 and an antenna unit 62. The terminal SAM 61 is composed of, for example, an IC card reader/writer.

The upper terminal 51 is, for example, a POS (Point Of Sales) terminal. The upper terminal 51 serving as an information processing apparatus issues an instruction to update data to an IC card 71 or transmits data read from the IC card 71, to a server 44 through the network 42.

The antenna unit 62 reads various types of data stored in the IC card 71 or writes data by performing contactless communication, such as NFC (Near Field communication) and other short distance wireless communication, with the external IC card 71. For example, the antenna unit 62 reads data, such as an identification number unique to the IC card 71 or the amount of money accumulated in the IC card 71, which is stored in the IC card 71. In addition, the antenna unit 62 rewrites (i.e., updates) data such as the amount of money accumulated in the IC card 71, by performing contactless communication with the IC card 71. At this time, information given and received between the IC card 71 and an application (i.e., an application of the terminal SAM 61) through the antenna unit 62 is being encrypted using a secret key. Note that although the present embodiment describes that the IC card 71 and the antenna unit 62 are of a contactless type, the IC card and the IC card reader/writer may be of a contact type.

The terminal SAM 61 serving as an information processing apparatus that communicates with the IC card 71 performs an encryption process and a decryption process on data supplied from the antenna unit 62. In addition, in order to obtain approval from the server 44, the terminal SAM 61 performs control to request the approval apparatus 43 for a signature of the public key of the terminal SAM 61. The terminal SAM 61 further performs control to transmit to the server 44 a terminal SAM digital certificate composed of the signature of the public key of the terminal SAM 61 and the terminal SAM's public key. In addition, the terminal SAM 61 executes an application and saves, as a log, a process execution result. Namely, the terminal SAM 61 securely manages data in the terminal SAM client 41.

[Hardware Configuration of a Terminal SAM]

Figure 5:
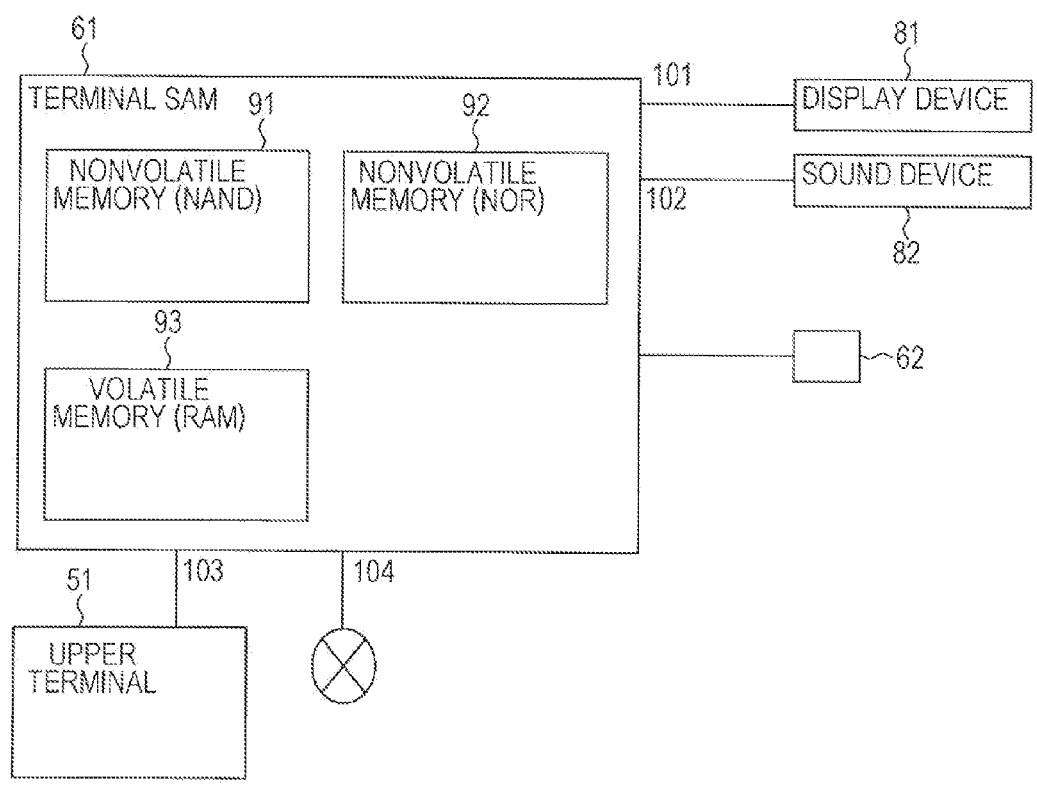
FIG. 5 is a block diagram showing a hardware configuration of a terminal SAM.

FIG. 5 is a block diagram showing a hardware configuration of the terminal SAM 61. The terminal SAM 61 includes a nonvolatile memory 91 composed of, for example, a NAND type memory; a nonvolatile memory 92 composed of, for example, a NOR type memory; and a volatile memory 93 composed of, for example, a RAM (Random Access Memory).

A service domain and an MC (Module Controller) domain are formed in the nonvolatile memory 91. A service application serving as a second application is registered in the service domain serving as a second domain, and an MC (Module Controller) application serving as a first application is registered in the MC domain serving as a first domain. The service application is a program that performs processes for the IC card 71, and is a program that performs a payment service in the case of the present embodiment. The MC application is a program that controls devices. Data, service logs or the like, are also stored in the nonvolatile memory 91. The MC application is hereinafter simply described as MC, and the service application is hereinafter simply described as SAP, as necessary.

A firmware (hereinafter, also described as FW as necessary) program execution area and an MC application execution area are formed in the nonvolatile memory 92. Namely, when the MC application is executed, the MC application is read from the nonvolatile memory 91 and expanded in the MC application execution area of the nonvolatile memory 92. A service application execution area is formed in the volatile memory 93. Namely, when the service application is executed, the service application is read from the nonvolatile memory 91 and expanded in the service application execution area of the volatile memory 93. Program heap areas are also formed in the volatile memory 93, in addition to various types of parameters.

To the terminal SAM 61 is connected a display device 81 such as an LCD (Liquid Crystal Display) through a communication interface 101 such as an SPI (System Packet Interface), and is connected a sound device 82 such as a speaker through a communication interface 102 such as an I2S (The Inter-IC Sound Bus). In addition, the terminal SAM 61 is connected to a network such as a LAN through an interface 104. The terminal SAM 61 is further connected to the upper terminal 51 through a serial interface 103.

[Software Configuration of the Terminal SAM]

Figure 6:
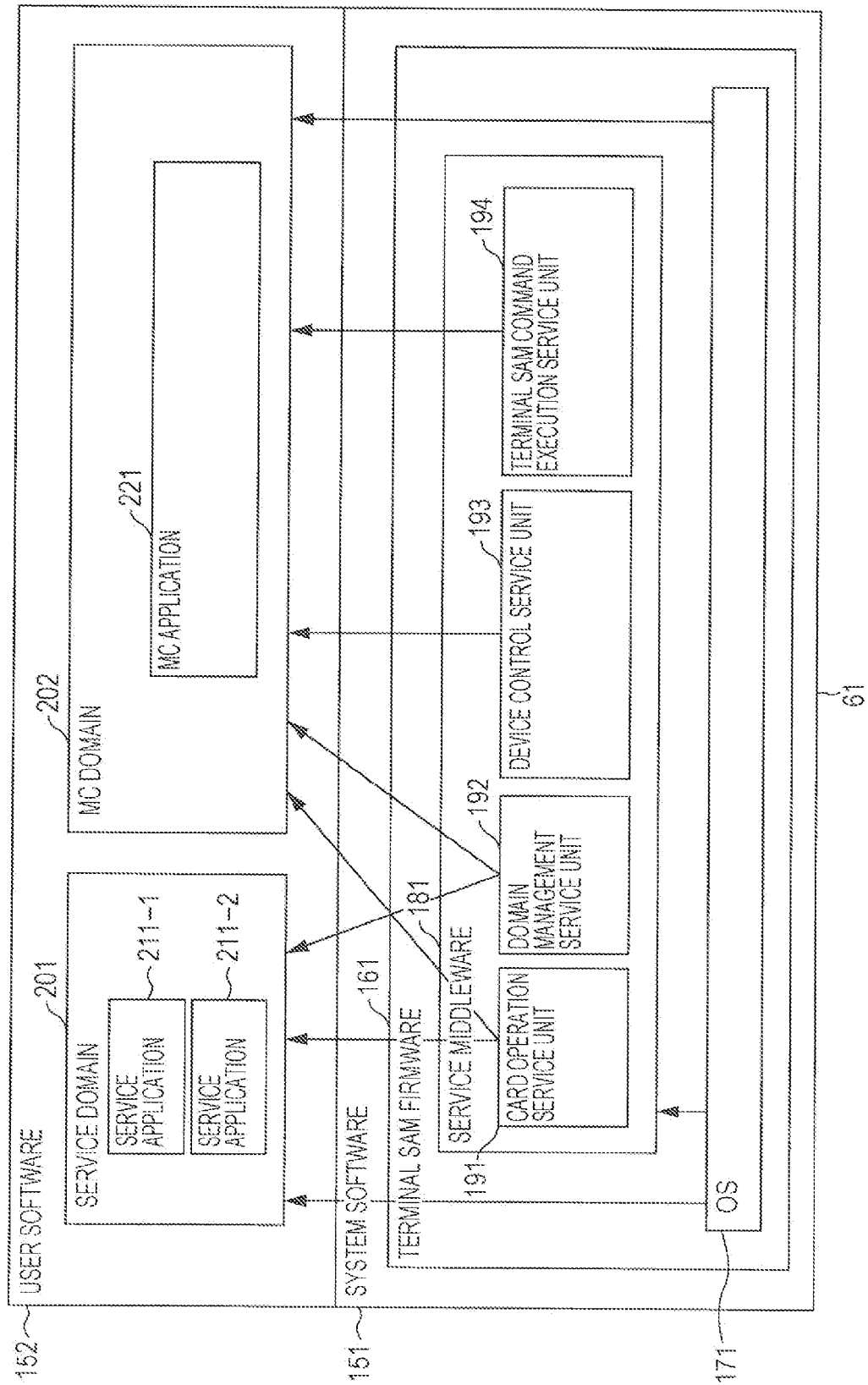
FIG. 6 is a diagram showing a software configuration of the terminal SAM.

FIG. 6 is a diagram showing a software configuration of the terminal SAM 61. The software of the terminal SAM 61 includes system software 151 and user software 152. The system software 151 is composed of a terminal SAM firmware 161.

The terminal SAM firmware 161 includes an OS (Operating System) 171 that performs task management, kernel resource management and the like; and service middleware 181 that operates on top of the OS 171. The service middleware 181 includes a card operation service unit 191, a domain management service unit 192, a device control service unit 193, and a terminal SAM command execution service unit 194.

The card operation service unit 191 performs a service corresponding to an operation performed on the IC card 71. The domain management service unit 192 performs domain management. The device control service unit 193 includes an SPI driver, a sound driver, a serial driver and the like, and performs device control. The terminal SAM command execution service unit 194 performs activation, activation of a service application and the like.

The user software 152 includes a service domain 201 and an MC domain 202. In the case of the example of FIG. 6, service applications 211-1 and 211-2 are registered in the service domain 201, and an MC application 221 is registered in the MC domain 202. Note that, when the service applications 211-1 and 211-2 do not need to be individually distinguished, they are simply described as the service application(s) 211.

An arrow in FIG. 6 indicates that an API (Application Programming Interface) is provided in the direction of the arrow. The OS 171 provides APIs to the service domain 201, the MC domain 202, and the service middleware 181. The card operation service unit 191 provides APIs to the service domain 201 and the MC domain 202. The domain management service unit 192 also provides APIs to the service domain 201 and the MC domain 202. The device control service unit 193 provides an API to the MC domain 202. The terminal SAM command execution service unit 194 also provides an API to the MC domain 202.

[Functional Configuration of an Upper Terminal]

Figure 7:
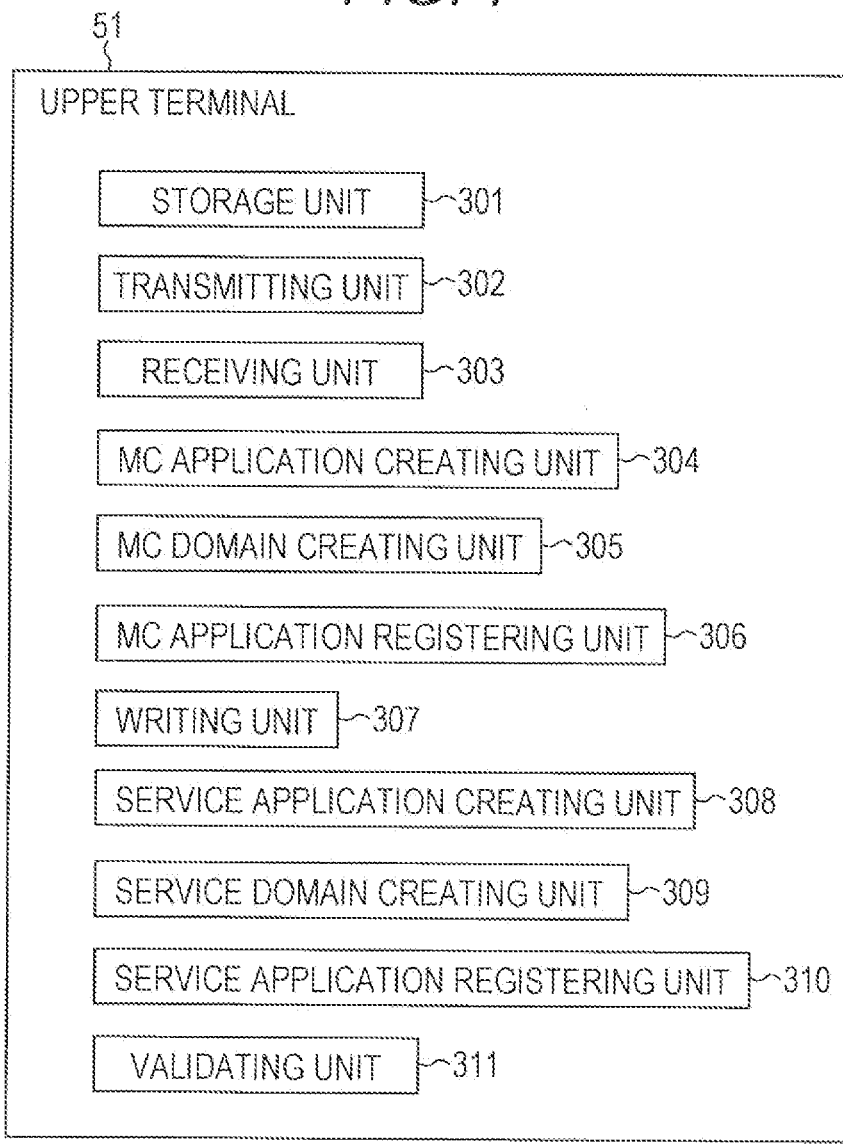
FIG. 7 is a block diagram showing a functional configuration of an upper terminal.

FIG. 7 is a block diagram showing a functional configuration of the upper terminal 51. The upper terminal 51 is provided with a storage unit 301, a transmitting unit 302, a receiving unit 303, an MC application creating unit 304, an MC domain creating unit 305, an MC application registering unit 306, a writing unit 307, a service application creating unit 308, a service domain creating unit 309, a service application registering unit 310, and a validating unit 311.

The storage unit 301 (virtually) stores information required to perform processes by the upper terminal 51.

Figure 8:
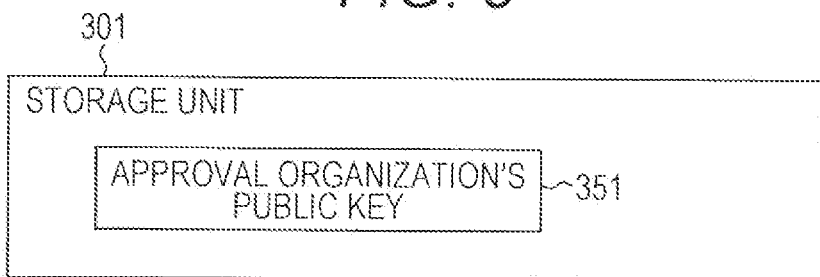
FIG. 8 is a diagram describing stored information in a storage unit of the upper terminal.

FIG. 8 is a diagram describing stored information in the storage unit 301 of the upper terminal 51. As shown in the drawing, the storage unit 301 stores an approval organization's public key 351.

The approval organization's public key 351 is a public key issued by the approval apparatus 43, and forms a key pair with the approval organization's private key held in the approval apparatus 43.

Referring back to FIG. 7, the transmitting unit 302 transmits information. The receiving unit 303 receives information.

The MC application creating unit 304 creates an MC application 221 that controls devices. The MC domain creating unit 305 creates an MC domain 202 where the MC application 221 is to be registered. The MC application registering unit 306 registers the MC application 221 in the MC domain 202. The writing unit 307 writes the MC application 221 into an execution area. The service application creating unit 308 creates a service application 211. The service domain creating unit 309 creates a service domain 201 where the service application 211 is to be registered. The service application registering unit 310 registers the service application 211 in the service domain 201. The validating unit 311 validates the MC application 221.

[Functional Configuration of the Terminal SAM]

Figure 9:
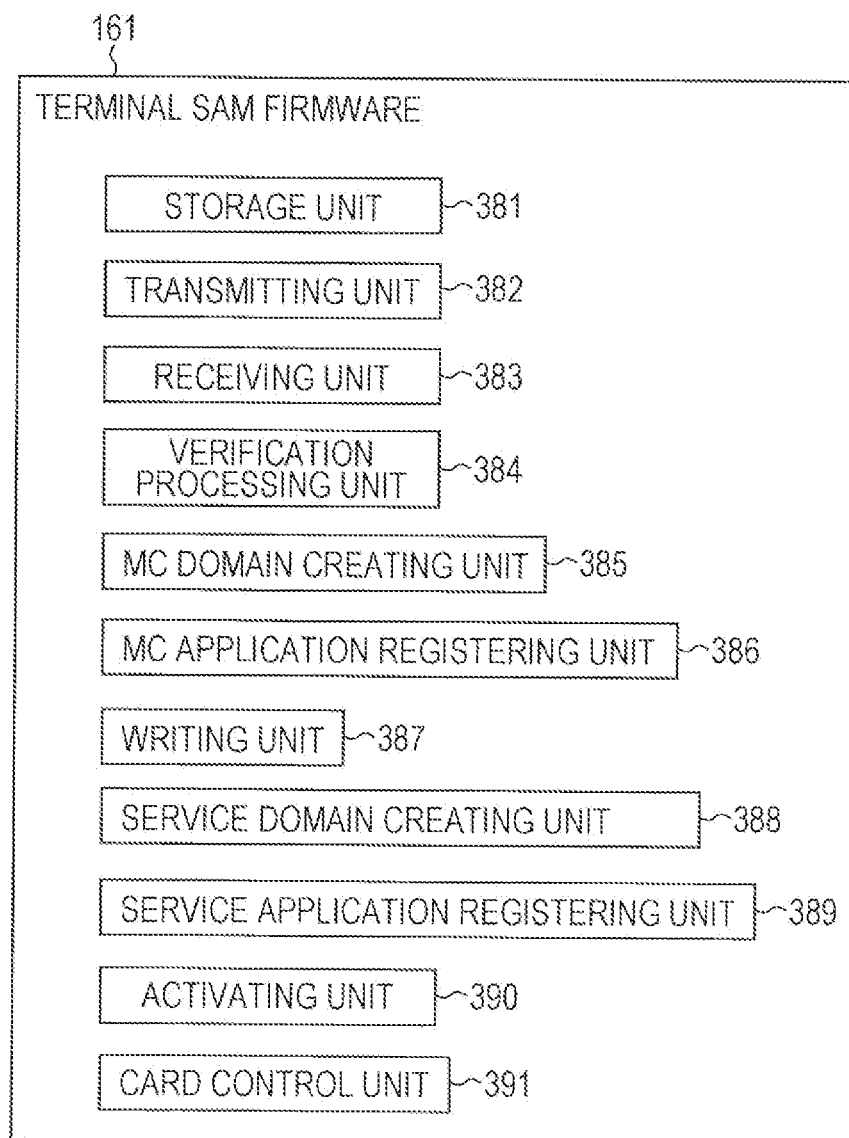
FIG. 9 is a diagram showing a functional configuration of terminal SAM firmware.

FIG. 9 is a diagram showing a functional configuration of the terminal SAM firmware 161. The terminal SAM firmware 161 is provided with a storage unit 381, a transmitting unit 382, a receiving unit 383, a verification processing unit 384, an MC domain creating unit 385, an MC application registering unit 386, a writing unit 387, a service domain creating unit 388, a service application registering unit 389, an activating unit 390, and a card control unit 391.

The storage unit 381 (virtually) stores information required to perform processes by the terminal SAM firmware 161.

Figure 10:
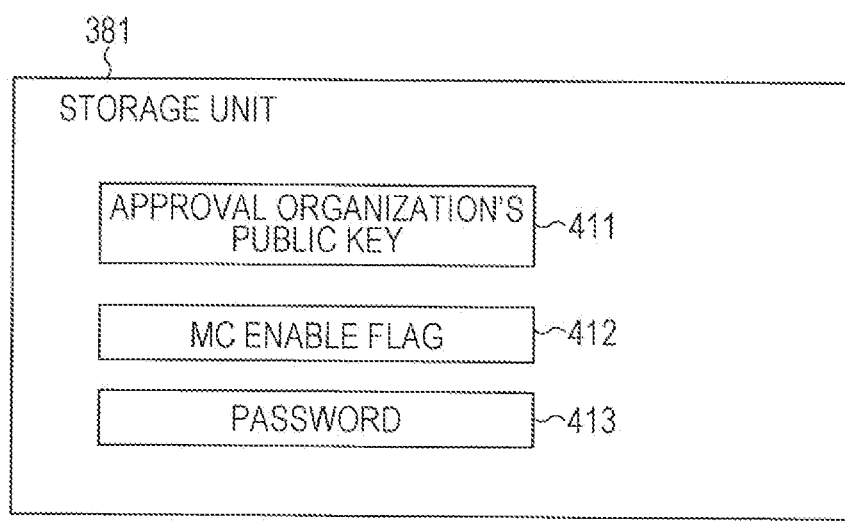
FIG. 10 is a diagram describing stored information in a storage unit of the terminal SAM firmware.

FIG. 10 is a diagram describing stored information in the storage unit 381 of the terminal SAM firmware 161. As shown in the drawing, the storage unit 381 stores an approval organization's public key 411, an MC enable flag 412, and a password 413.

The MC enable flag 412 is set to ON when the upper terminal 51 validates the MC application 221. The password 413 is stored to perform authentication of an administrator of the upper terminal 51.

Referring back to FIG. 9, the transmitting unit 382 transmits information. The receiving unit 383 receives information. The verification processing unit 384 performs the process of verifying that predetermined data is valid. For example, the verification processing unit 384 verifies using a transmitter's public key that predetermined data is valid.

The MC domain creating unit 385 creates an MC domain 202 where the MC application 221 is to be registered. The MC application registering unit 386 registers the MC application 221 in the MC domain 202. The writing unit 387 writes the MC application 221 into an execution area. The service application creating unit 388 creates a service application 211. The service domain creating unit 389 creates a service domain 201 where the service application 211 is to be registered. The service application registering unit 390 registers the service application 211 in the service domain 201. The activating unit 390 performs an activation process. The card control unit 391 performs a service corresponding to an operation performed on the IC card 71.

Note that the units of the service middleware 181 of FIG. 6 correspond to the following units of the terminal SAM firmware of FIG. 9.

card operation service unit 191→card control unit 391 domain management service unit 192→MC domain creating unit 385, MC application registering unit 386, writing unit 387, service domain creating unit 388, and service application registering unit 389 device control service unit 193→storage unit 381, transmitting unit 382, receiving unit 383, and activating unit 390 terminal SAM command execution service unit 194→verification processing unit 384

[Application Registration Process]

Figure 11:
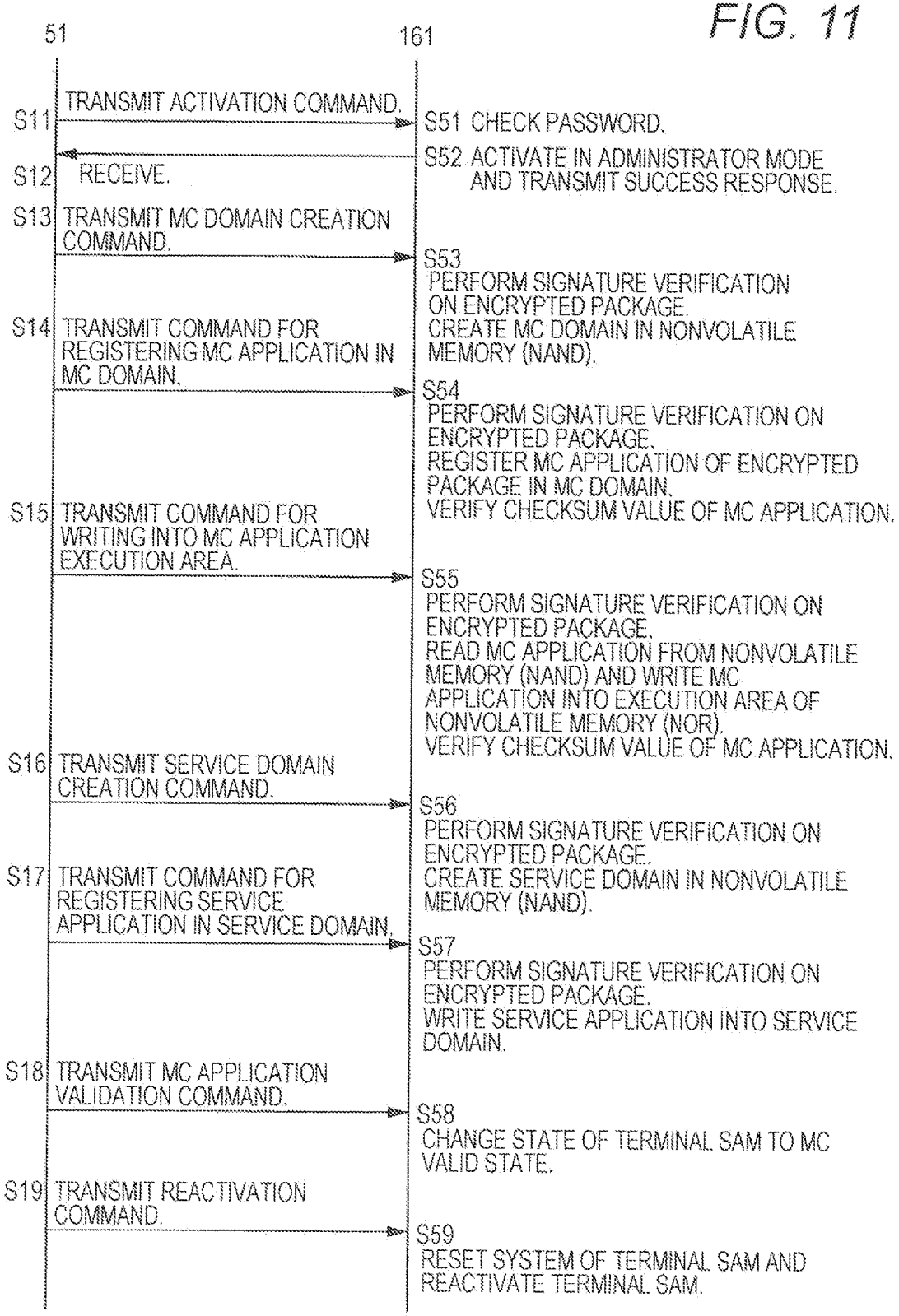
FIG. 11 is a flowchart describing registration of applications.

FIG. 11 is a flowchart describing registration of applications. With reference to this FIG. 11, registration of applications will be described below. Note that the following communication between the upper terminal 51 and the terminal SAM firmware 161 is performed through the serial interface 103.

At step S11, the transmitting unit 302 of the upper terminal 51 transmits an activation command to the terminal SAM 61 in administrator mode. This process is performed based on an instruction from an administrator of the upper terminal 51, when an MC application 221 or a service application 211 is set up on the terminal SAM 61. At this time, an activation password inputted by the administrator is transmitted.

At step S51, the terminal SAM 61, more specifically, the receiving unit 383 of the terminal SAM firmware 161, receives the activation command transmitted through the serial interface 103. The verification processing unit 384 checks the activation password included in the activation command. Specifically, the password 413 stored in the storage unit 381 is checked against the received activation password. When the two passwords match each other, at step S52, the activating unit 390 performs an activation process in administrator mode. When the two passwords do not match each other, it is determined that the instruction is not from the administrator, and thus, an activation process is not performed. By this, only a specific administrator can perform an application registration process.

In addition, when the activation process is succeeded, at step S52, the transmitting unit 382 transmits a success response indicating that activation has been succeeded.

At step S12, the receiving unit 303 of the upper terminal 51 receives the response from the terminal SAM firmware 161. When a success response cannot be received within a fixed period of time after the transmission of the activation command, an activation command is transmitted again or the process is stopped.

At step S13, the MC domain creating unit 305 creates an MC domain creation command. Then, the transmitting unit 302 transmits the MC domain creation command. The command is in the form of an encrypted package as shown in FIG. 12.

Here, the encrypted package refers to one in which transmission content, such as a message or an application, and a signature generated by encrypting the transmission content by a private key are combined as a pair and packaged. In this embodiment, as the private key for the encryption, the private key of the approval apparatus 43 is used. The encryption is performed by performing compression using a hash function which is a one-way function. Since the function is a one-way function, a compressed value cannot be converted back into original plaintext. Other functions than the hash function can also be used as one-way functions. Note that an apparatus that creates an encrypted package and an apparatus that decrypts the encrypted package hold the same one-way function in advance.

Figure 12:
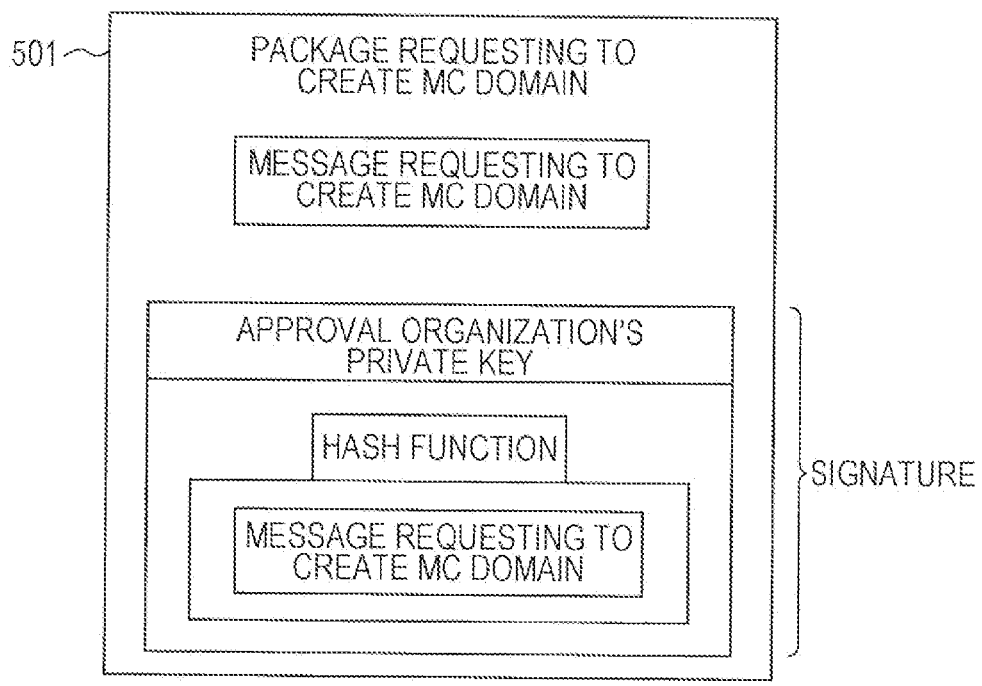
FIG. 12 is a diagram showing an example of a package requesting to create an MC domain.

FIG. 12 is a diagram showing an example of a package 501 requesting to create an MC domain. The package 501 requesting to create an MC domain is composed of a message requesting to create an MC domain; and a signature of the message requesting to create an MC domain. The MC domain creating unit 305 creates a message requesting to create an MC domain. The message is a message serving as a command requesting to create an MC domain 202 and is plaintext.

The plaintext message requesting to create an MC domain is transmitted to the approval apparatus 43. The approval apparatus 43 compresses the message requesting to create an MC domain, using the hash function, and encrypts the compressed result by the private key of the approval apparatus 43, and thereby obtains a signature. The approval apparatus 43 combines the message requesting to create an MC domain and the signature as a pair, and thereby creates a package 501 requesting to create an MC domain. The package 501 requesting to create an MC domain is transmitted from the approval apparatus 43 to the upper terminal 51. The process of preparing the package may be performed in real time or can also be performed in advance. This also applies to the processes of preparing packages in FIGS. 13 to 16 which will be described later.

At step S53, the receiving unit 383 of the terminal SAM firmware 161 receives the package 501 requesting to create an MC domain which is transmitted from the upper terminal 51. The verification processing unit 384 performs signature verification on the received encrypted package. Specifically, the verification processing unit 384 decrypts the signature of the package 501 requesting to create an MC domain, by the approval organization's public key 411. By this, a message requesting to create an MC domain which is compressed by the hash function is obtained. In addition, the verification processing unit 384 compresses the plaintext message requesting to create an MC domain, by applying the hash function thereto. Then, the verification processing unit 384 compares the compressed value obtained by the decryption with the compressed value obtained by compressing the plaintext.

If the two values match each other, i.e., if verification is succeeded, then it indicates that the plaintext message requesting to create an MC domain which is described in the package 501 requesting to create an MC domain is authentic and not tampered with. The reason therefor is that one that can generate a signature that can be decrypted by the approval organization's public key 411 is only one that possesses the approval organization's private key. Then, the one that possesses the approval organization's private key is only the approval apparatus 43.

On the other hand, if the two values do not match each other, i.e., if verification fails, then it indicates that the message requesting to create an MC domain has been tampered with. In this case, the process of registering the MC application 221 and the service application 211 ends.

As such, by forming a command in the form of an encrypted package, tampering of the command can be prevented.

Note that the terminal SAM 61 also receives the approval organization's public key 411 in advance from the approval apparatus 43, and stores the approval organization's public key 411 in the storage unit 381.

When verification is succeeded in the above-described manner, at step S53, the MC domain creating unit 385 creates an MC domain 202 in the nonvolatile memory 91.

At step S14, the MC application creating unit 304 of the upper terminal 51 creates an MC application 221. By the MC application 221, control of communication with the upper terminal 51 and control of the display device 81, the sound device 82, and other UI devices in the terminal SAM 61 are performed. The priority of the MC application 221 is higher than that of the terminal SAM firmware 161. In addition, an API (Application Interface) of the terminal SAM firmware 161 that can be used by the MC application 221 differs from that of a service application 211. When the MC application 221 is created, other program execution areas and program priorities are thereafter set to those allowed by the MC application 221.

Since the MC application 221 is thus set, the immediacy of device control by the upper terminal 51 can be ensured. In addition, since the MC application 221 is prepared separately from the service application 211, the application that performs device control (i.e., the MC application 221) can be allowed to stay resident in the terminal SAM 61.

Furthermore, at step S14, the MC application registering unit 306 of the upper terminal 51 creates a command for registering the MC application in the MC domain. Then, the transmitting unit 302 transmits the command for registering the MC application in the MC domain. The command is in the form of an encrypted package as shown in FIG. 13.

Figure 13:
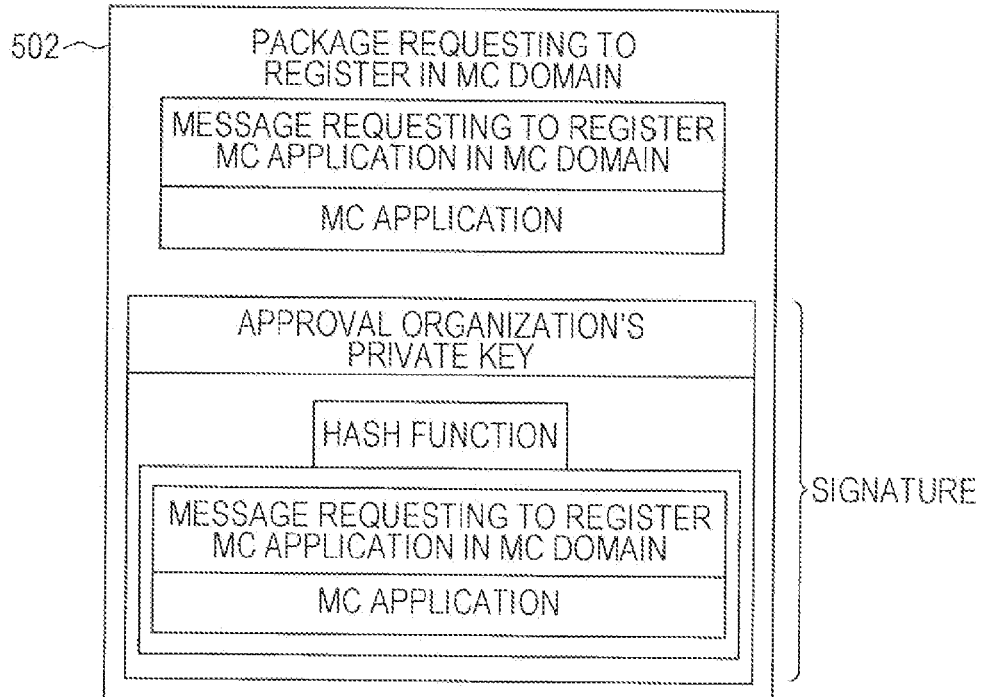
FIG. 13 is a diagram showing an example of a package requesting to register in the MC domain.

FIG. 13 is a diagram showing an example of a package 502 requesting to register in the MC domain. The package 502 requesting to register in the MC domain is composed of a message requesting to register the MC application in the MC domain and the MC application 221; and a signature thereof. The MC application registering unit 306 creates a message requesting to register the MC application in the MC domain. The message is a message requesting to register the MC application 221 in the MC domain 202 and is plaintext. The MC application 221 is also likewise plaintext.

The message requesting to register the MC application in the MC domain and the MC application 221 are transmitted to the approval apparatus 43. The approval apparatus 43 compresses the message requesting to register the MC application in the MC domain and the MC application 221 using a hash function. The approval apparatus 43 further encrypts the compressed results by the approval organization's private key, and thereby obtains a signature. The approval apparatus 43 combines the message requesting to register the MC application in the MC domain and the MC application 221, and the signature as a pair, and thereby creates a package 502 requesting to register in the MC domain. The package 502 requesting to register in the MC domain is transmitted from the approval apparatus 43 to the upper terminal 51.

At step S54, the receiving unit 383 of the terminal SAM firmware 161 receives the encrypted package, that is, the package 502 requesting to register in the MC domain. The verification processing unit 384 performs signature verification on the encrypted package. Specifically, the verification processing unit 384 decrypts the signature of the package 502 requesting to register in the MC domain, by the approval organization's public key 414. By this, a message requesting to register the MC application in the MC domain and an MC application 221 which are compressed by the hash function are obtained. In addition, the verification processing unit 384 compresses the plaintext message requesting to register the MC application in the MC domain and the plaintext MC application 221, by applying the hash function thereto. Then, the verification processing unit 384 compares the compressed values obtained by the decryption with the compressed values obtained by compressing the plaintext.

If the values match each other, that is, if verification is succeeded, then it indicates that the plaintext message requesting to register the MC application in the MC domain and the plaintext MC application 221 which are described in the package 502 requesting to register the MC application in the MC domain are authentic and not tampered with. On the other hand, if the values do not match each other, that is, if verification fails, then it indicates that the message requesting to register the MC application in the MC domain or the MC application 221 has been tampered with. In this case, the process of registering the MC application 221 and the service application 211 ends. The processes performed so far are invalidated.

When verification is succeeded, the MC application registering unit 386 registers the received MC application 221 in the MC domain 202 which is created in the nonvolatile memory 91 in the process at step S53. Furthermore, the verification processing unit 384 verifies the checksum value of the MC application 221. If a computed checksum value matches the checksum value registered in the MC application 221, then it is confirmed that there is no error in the MC application 221.

At step S15, the writing unit 307 of the upper terminal 51 creates a command for writing into the MC application execution area, and the transmitting unit 302 transmits the command. The command is in the form of an encrypted package as shown in FIG. 14.

Figure 14:
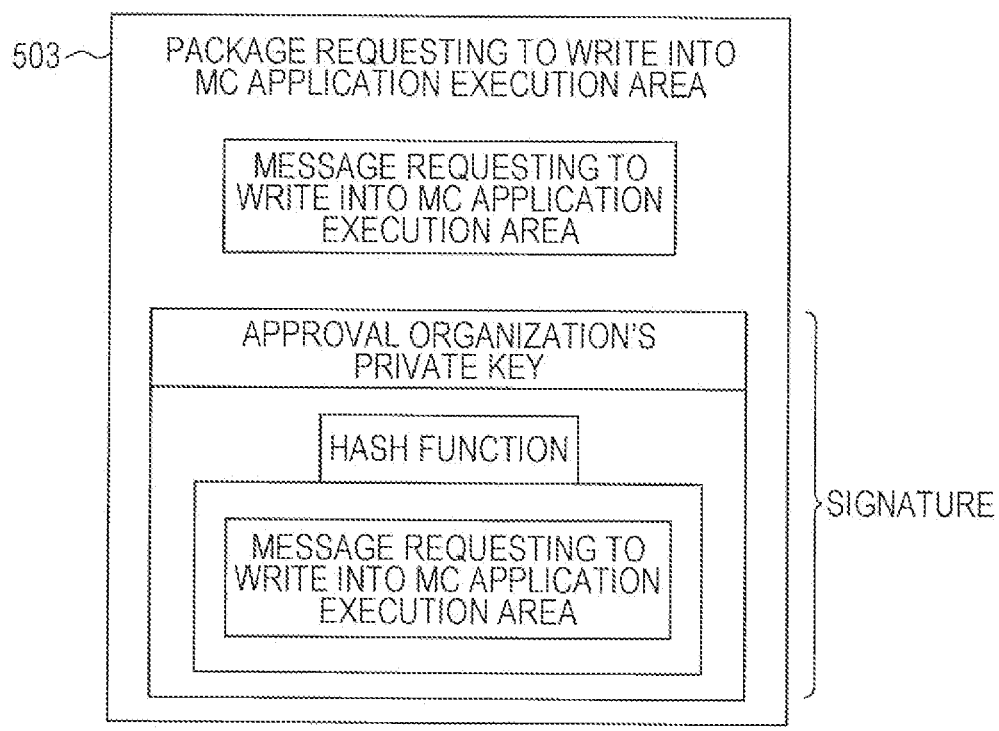
FIG. 14 is a diagram showing an example of a package requesting to write into an MC application execution area.

FIG. 14 is a diagram showing an example of a package requesting to write into the MC application execution area. A package 503 requesting to write into the MC application execution area is composed of a message requesting to write into the MC application execution area; and a signature thereof. The writing unit 307 creates a message requesting to write into the MC application execution area. The message is a message requesting to write the MC application 221 into the execution area and is plaintext.

The message requesting to write into the MC application execution area is transmitted to the approval apparatus 43. The approval apparatus 43 compresses the message requesting to write into the MC application execution area, using a hash function. The approval apparatus 43 further encrypts the compressed result by the approval organization's private key, and thereby obtains a signature. The approval apparatus 43 combines the message requesting to write into the MC application execution area and the signature as a pair, and thereby creates a package 503 requesting to write into the MC application execution area. The package 503 requesting to write into the MC application execution area is transmitted from the approval apparatus 43 to the upper terminal 51.

At step S55, the receiving unit 383 of the terminal SAM firmware 161 receives the encrypted package, that is, the command requesting to write into the MC application execution area. The verification processing unit 384 performs signature verification on the encrypted package. Specifically, the verification processing unit 384 decrypts the signature of the package 503 requesting to write into the MC application execution area, by the approval organization's public key 414. By this, a message requesting to write into the MC application execution area which is compressed by the hash function is obtained. In addition, the verification processing unit 384 compresses the plaintext message requesting to write into the MC application execution area, by applying the hash function thereto. Then, the verification processing unit 384 compares the compressed value obtained by the decryption with the compressed value obtained by compressing the plaintext.

If the two values match each other, that is, if verification is succeeded, then it indicates that the plaintext message requesting to write into the MC application execution area described in the package 503 requesting to write into the MC application execution area is authentic and not tampered with. On the other hand, if the two values do not match each other, that is, if verification fails, then it indicates that the message requesting to write into the MC application execution area has been tampered with. In this case, the process of registering the MC application 221 and the service application 211 ends. The processes performed so far are invalidated.

When verification is succeeded, at step S55, the writing unit 387 reads the MC application 221 which is registered, in the process at step S54, in the MC domain 202 which is created in the nonvolatile memory 91 in the process at step S53, and writes the MC application 221 into the execution area of the nonvolatile memory 92. By this, the MC application 221 can be allowed to stay resident regardless of switching of the service application 211. In addition, the MC application 221 can be activated earlier than the service application 211. Furthermore, the verification processing unit 384 verifies the checksum value of the MC application 221. If a computed checksum value matches the checksum value registered in the MC application 221, then it is confirmed that there is no error in the MC application 221.

At step S16, the service domain creating unit 309 of the upper terminal 51 creates a service domain creation command. Then, the transmitting unit 302 transmits the service domain creation command. The command is in the form of an encrypted package as shown in FIG. 15.

Figure 15:
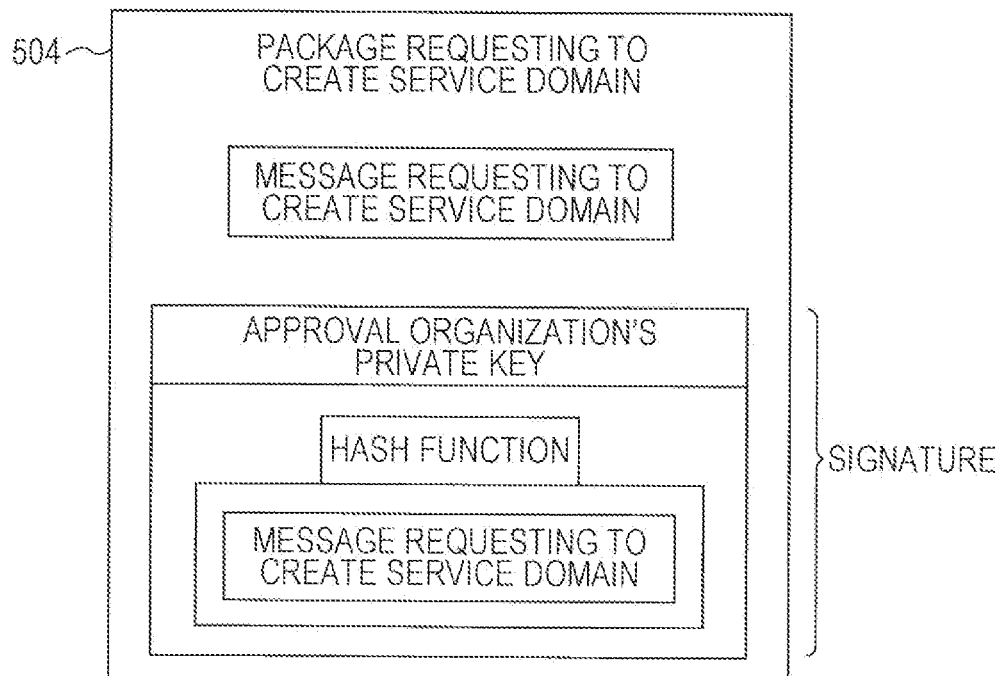
FIG. 15 is a diagram showing an example of a package requesting to create a service domain.

FIG. 15 is a diagram showing an example of a package 504 requesting to create a service domain. The package 504 requesting to create a service domain is composed of a message requesting to create a service domain; and a signature thereof. The service domain creating unit 309 creates a message requesting to create a service domain. The message is a message serving as a command requesting to create a service domain 201 and is plaintext.

The message requesting to create a service domain is transmitted to the approval apparatus 43. The approval apparatus 43 compresses the message requesting to create a service domain, using a hash function. The approval apparatus 43 further encrypts the compressed result by the approval organization's private key, and thereby obtains a signature. The approval apparatus 43 combines the message requesting to create a service domain and the signature as a pair, and thereby creates a package 504 requesting to create a service domain. The package 504 requesting to create a service domain is transmitted from the approval apparatus 43 to the upper terminal 51.

At step S56, the receiving unit 383 of the terminal SAM firmware 161 receives the package 504 requesting to create a service domain which is transmitted from the upper terminal 51. The verification processing unit 384 performs signature verification on the received encrypted package. Specifically, the verification processing unit 384 decrypts the signature of the package 504 requesting to create a service domain, by the approval organization's public key 414. By this, a message requesting to create a service domain which is compressed by the hash function is obtained. In addition, the verification processing unit 384 compresses the plaintext message requesting to create a service domain, by applying the hash function thereto. Then, the verification processing unit 384 compares the compressed value obtained by the decryption with the compressed value obtained by compressing the plaintext.

If the two values match each other, that is, if verification is succeeded, then it indicates that the plaintext message requesting to create a service domain which is described in the package 504 requesting to create a service domain is authentic and not tampered with. On the other hand, if the two values do not match each other, that is, if verification fails, then it indicates that the message requesting to create a service domain has been tampered with. In this case, the process of registering the MC application 221 and the service application 211 ends. The processes performed so far are invalidated.

When verification is succeeded in the above-described manner, the service domain creating unit 388 creates a service domain 201 in the nonvolatile memory 91.

At step S17, the service application creating unit 308 of the upper terminal 51 creates a service application 211. By the service application 211, control of a payment process in the terminal SAM 61 is performed. The priority of the service application 211 is lower than those of the MC application 221 and the terminal SAM firmware 161. This is to not disturb the operation of the MC application 221 and the terminal SAM firmware 161. In addition, an API (Application Interface) of the terminal SAM firmware 161 that can be used by the service application 211 differs from that of the MC application 221. The program execution area and program priority of the service program are set to those allowed by the MC application 221.

Furthermore, the service application registering unit 310 of the upper terminal 51 creates a command for registering the service application in the service domain, and the transmitting unit 302 transmits the command. The command is in the form of an encrypted package as shown in FIG. 16.

Figure 16:
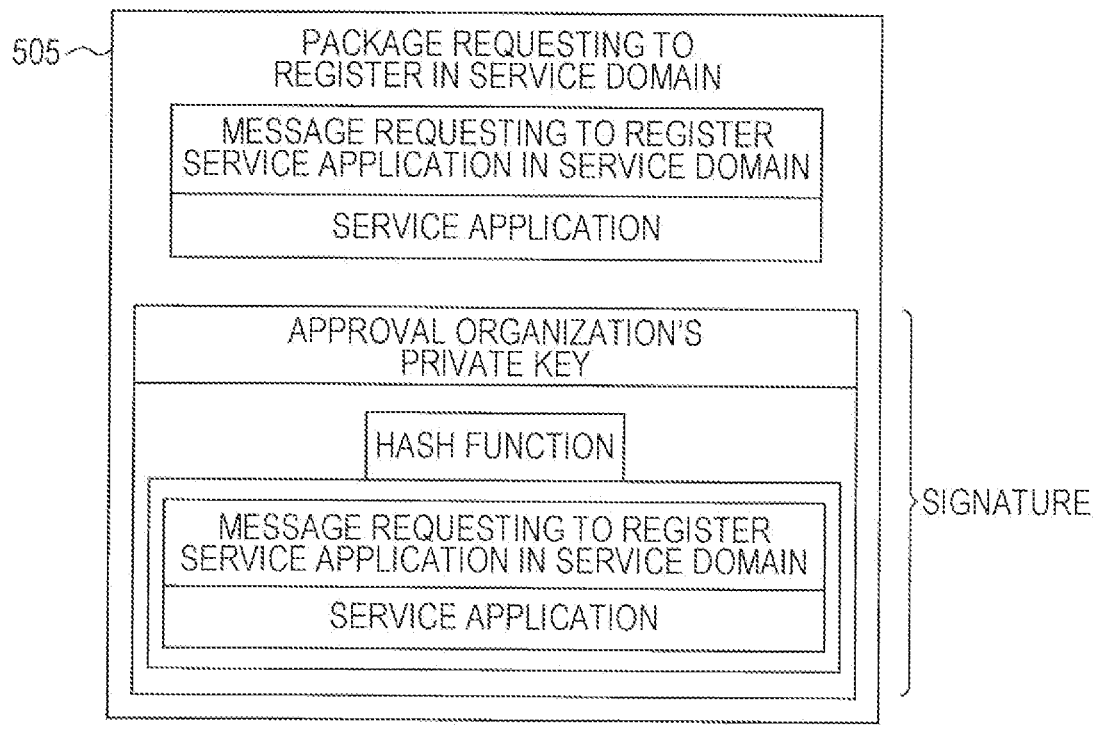
FIG. 16 is a diagram showing an example of a package requesting to write into a service application execution area.

FIG. 16 is a diagram showing an example of a package 505 requesting to register in the service domain. The package 505 requesting to register in the service domain is composed of a message requesting to register the service application in the service domain and the service application; and a signature thereof. The service application registering unit 310 creates a message requesting to register the service application in the service domain. The message is a message requesting to register the service application 211 in the service domain 201 and is plaintext. The service application 211 is also likewise plaintext.

The message requesting to register the service application in the service domain and the service application 211 are transmitted to the approval apparatus 43. The approval apparatus 43 compresses the message requesting to register the service application in the service domain and the service application 211, using a hash function. The approval apparatus 43 further encrypts the compressed results by the approval organization's private key, and thereby obtains a signature. The approval apparatus 43 combines the message requesting to register the service application in the service domain and the signature as a pair, and thereby creates a package 505 requesting to register in the service domain. The package 505 requesting to register in the service domain is transmitted from the approval apparatus 43 to the upper terminal 51.

At step S57, the receiving unit 383 of the terminal SAM firmware 161 receives the encrypted package, that is, the command for registering the service application in the service domain. The verification processing unit 384 performs signature verification on the encrypted package. Specifically, the verification processing unit 384 decrypts the signature of the package 505 requesting to register in the service domain, by the approval organization's public key 414. By this, a message requesting to register the service application in the service domain and a service application 211 which are compressed by the hash function are obtained. In addition, the verification processing unit 384 compresses the plaintext message requesting to register the service application in the service domain and the plaintext service application 211, by applying the hash function thereto. Then, the verification processing unit 384 compares the compressed values obtained by the decryption with the compressed values obtained by compressing the plaintext.

If the values match each other, that is, if verification is succeeded, then it indicates that the plaintext message requesting to register the service application in the service domain and the plaintext service application 211 which are described in the package 505 requesting to register the service application in the service domain are authentic and not tampered with. On the other hand, if the values do not match each other, that is, if verification fails, then it indicates that the message requesting to register the service application in the service domain or the service application 211 has been tampered with. In this case, the process of registering the MC application 221 and the service application 211 ends. The processes performed so far are invalidated.

When verification is succeeded, the service application registering unit 389 registers the received service application 211 in the service domain 201 which is created in the nonvolatile memory 91 in the process at step S56. Furthermore, the verification processing unit 384 verifies the checksum value of the service application 211. If a computed checksum value matches the checksum value registered in the service application 211, then it is confirmed that there is no error in the service application 211.

At step S18, the validating unit 311 of the upper terminal 51 creates an MC command validation command. The transmitting unit 302 transmits the MC command validation command.

At step S58, the receiving unit 383 of the terminal SAM firmware 161 receives the MC command validation command. The activating unit 390 changes the state of the terminal SAM 61 to an MC valid state. Specifically, the MC enable flag 412 serving as validation information is set to ON and stored in the storage unit 381. The MC enable flag 412 is used in a determination process at step S83 of FIG. 17 which will be described later. Specifically, when the MC enable flag 412 is set to ON upon the next activation, the terminal SAM 61 is activated in MC activation mode. When the MC enable flag 412 is not set to ON, that is, when set to OFF, the MC application 221 is not activated. Therefore, the administrator of the upper terminal 51 can freely select activation of the MC application 221 by making a selection as to whether to perform validation.

At step S19, the transmitting unit 302 of the upper terminal 51 transmits a reactivation command.

At step S59, the receiving unit 383 of the terminal SAM firmware 161 receives the reactivation command. The activating unit 390 resets the system of the terminal SAM 61 and reactivates the terminal SAM 61.

In the above-described manner, the MC application 221 and the service application 211 which are created by the upper terminal 51 are set on the terminal SAM 61.

[System Power Activation Process]

Figure 17:
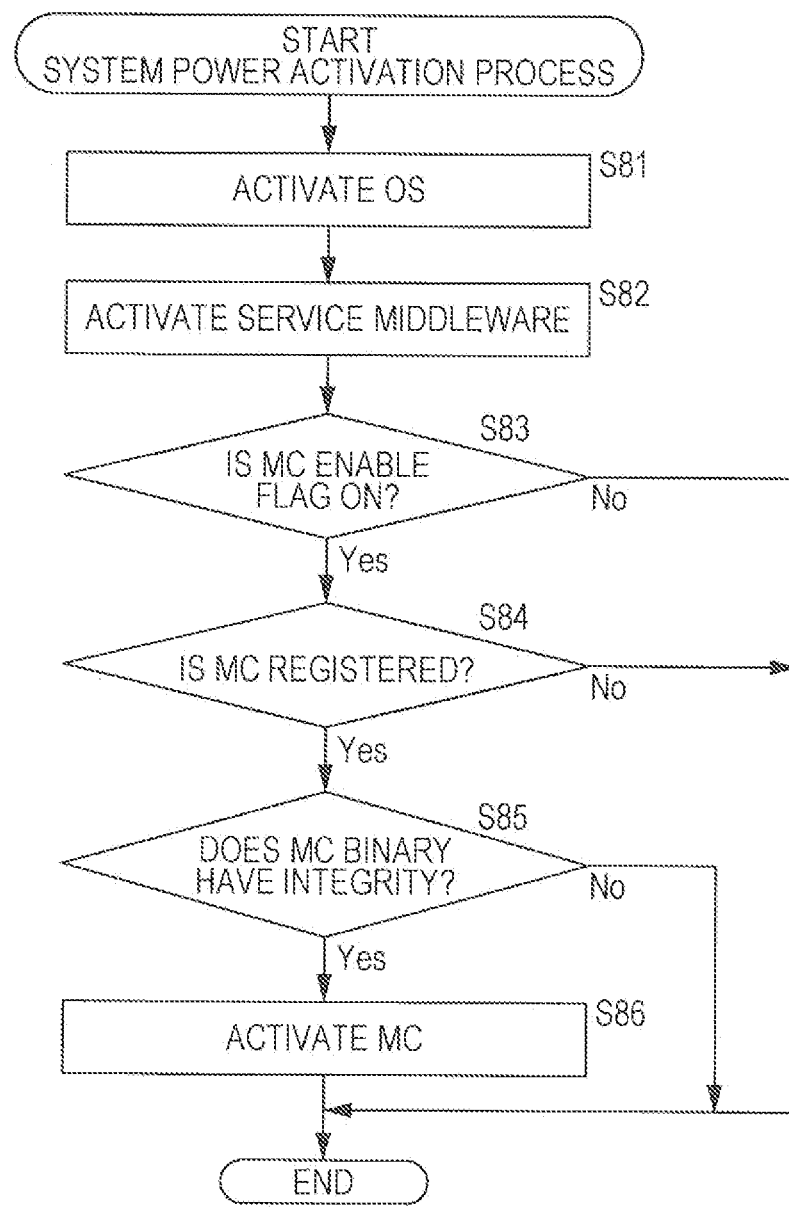
FIG. 17 is a flowchart describing a system power activation process.

FIG. 17 is a flowchart describing a system power activation process. Next, with reference to this FIG. 17, a system power activation process in the terminal SAM 61 will be described. The process is performed when activation is instructed by, for example, turning on the power to the terminal SAM 61.

At step S81, the OS 171 of the terminal SAM firmware 161 is activated. At step S82, the OS 171 activates the service middleware 181. At step S83, the service middleware 181 determines whether the MC enable flag 412 is ON. The MC enable flag 412 is set to ON or OFF in the processes at steps S18 and S58 of FIG. 11.

When the MC enable flag 412 is set to ON, at step S84, the service middleware 181 determines whether an MC is registered. Specifically, it is determined whether an MC application 221 is registered in the execution area of the nonvolatile memory 92 in the process at step S55 of FIG. 11.

If the MC application 221 is registered, at step S85, the OS 171 determines whether the MC binary has integrity. Specifically, it is checked whether a checksum value matches the registered one, whether there is a violation of the number of tasks or the number of kernel resources which are recorded in a header, and whether a priority order is followed. If the MC binary has integrity, at step S86, the OS 171 activates the MC application 221.

If it is determined at step S83 that the MC enable flag 412 is OFF, the process of activating the MC application 221 at step S86 is not performed. When it is determined at step S84 that the MC application 221 is not registered, too, the process of activating the MC application 221 at step S86 is not performed. Furthermore, when it is determined at step S85 that the MC binary does not have integrity, that is, when the MC binary is a binary that cannot be activated, too, the process of activating the MC application 221 is not performed.

The system power activation process has been described above.

[Configurations of an MC Application and a Service Application]

Next, before describing a payment service process, the configurations of an MC application 221 and a service application 211 will be described.

Figure 18:
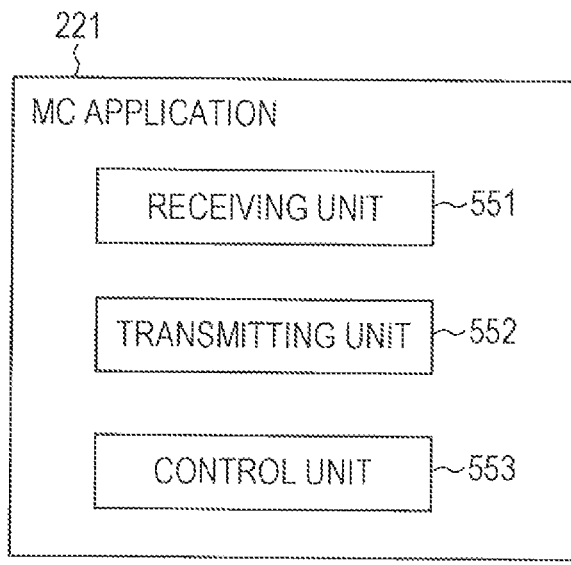
FIG. 18 is a diagram showing a functional configuration of an MC application.

FIG. 18 is a diagram showing a functional configuration of an MC application 221. As shown in the drawing, the MC application 221 includes a receiving unit 551, a transmitting unit 552, and a control unit 553.

The receiving unit 551 receives information. The transmitting unit 552 transmits information. The control unit 553 performs various types of control.

Figure 19:
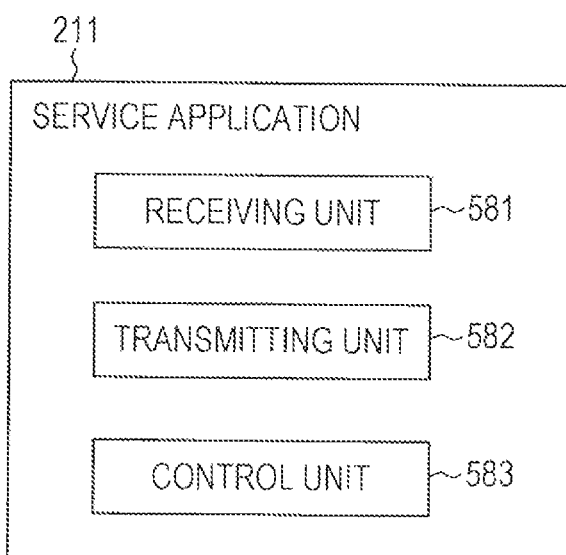
FIG. 19 is a diagram showing a functional configuration of a service application.

FIG. 19 is a diagram showing a functional configuration of a service application 211. The service application 211 includes a receiving unit 581, a transmitting unit 582, and a control unit 583.

The receiving unit 581 receives information. The transmitting unit 582 transmits information. The control unit 583 performs various types of control.

[Payment Service Process]

Figure 20:
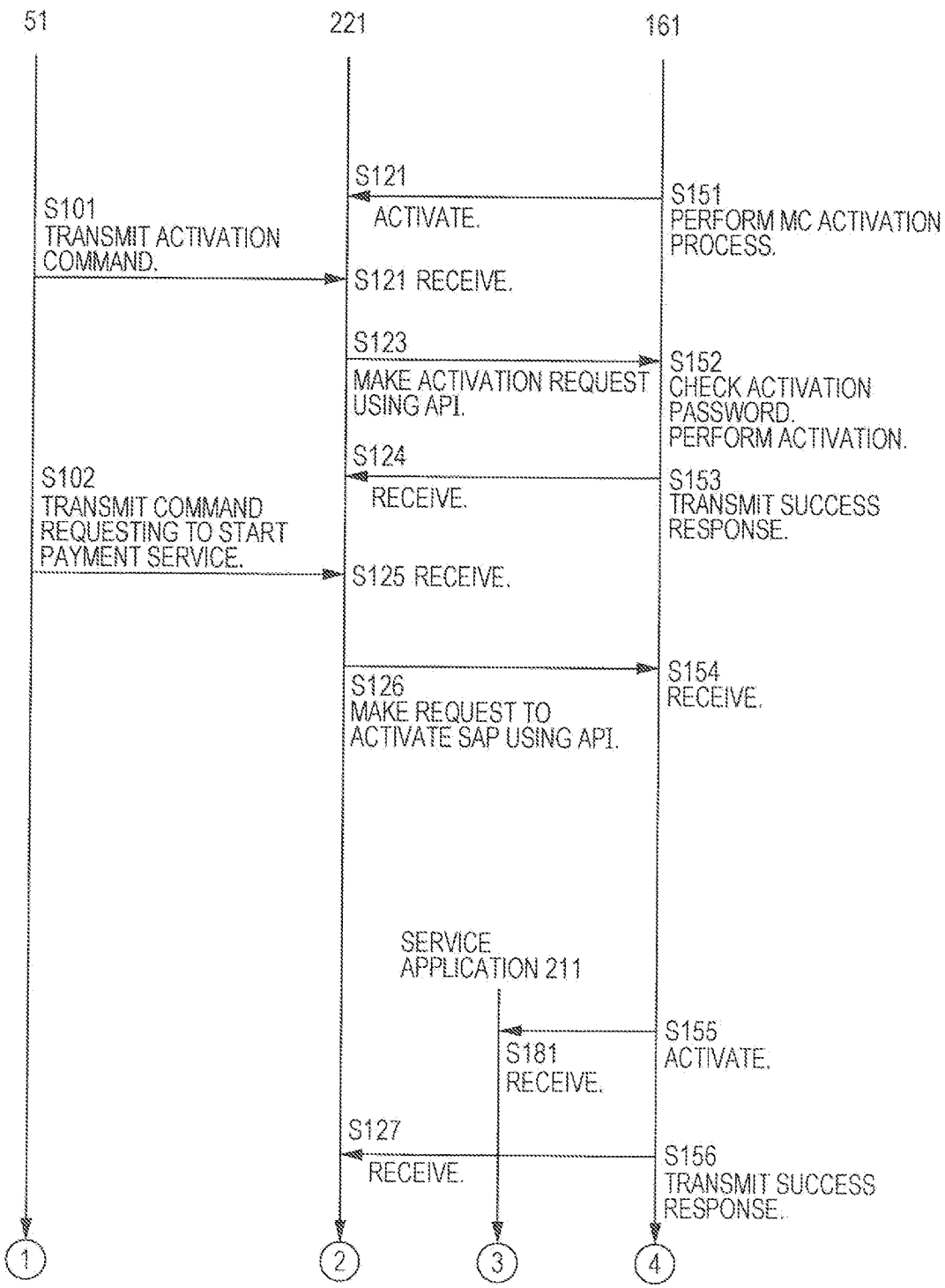
FIG. 20 is a flowchart describing a payment service process.
Figure 21:
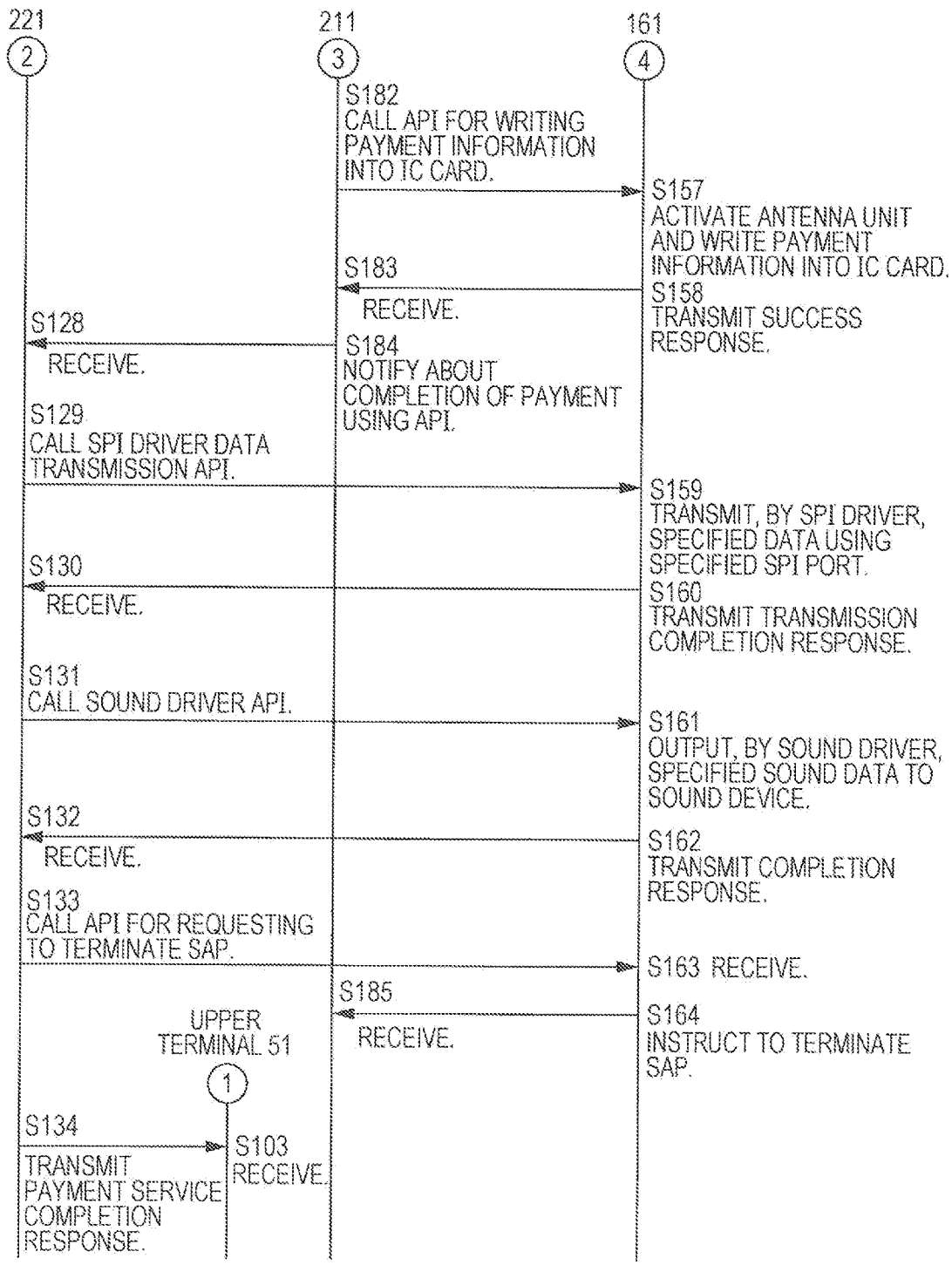
FIG. 21 is a flowchart describing a payment service process.

FIGS. 20 and 21 are flowcharts describing a payment service process. With reference to the drawings, a payment service process will be described below.

At step S151, the terminal SAM firmware 161 performs an MC activation process. Specifically, by the reactivation process at step S59 of FIG. 11, the system power activation process of FIG. 17 is performed. Specifically, when the conditions at steps S83, S84, and S85 which are described with reference to FIG. 17 are satisfied, the activating unit 390 of the terminal SAM firmware 161 instructs the MC application 221 for activation. At step S121, the receiving unit 551 of the MC application 221 receives the instruction. The control unit 553 activates the MC application 221 based on the instruction.

As such, when the MC enable flag 412 is ON, the MC application 221 can be activated simultaneously with the activation of the terminal SAM 61.

At step S101, the transmitting unit 302 of the upper terminal 51 transmits an activation command requesting to perform a payment service in operation mode, to the MC application 221. The command including an activation password is transmitted through the serial interface 103. Since the MC application 221 can freely control a communication device of the terminal SAM 61, the MC application 221 can perform communication with the upper terminal 51 by defining its original communication channel and its original protocol.

At step S122, the receiving unit 551 of the MC application 221 receives the command. In response to the activation command from the upper terminal 51, at step S123, the control unit 553 makes an activation request using an API of the terminal SAM 61.

At step S152, the receiving unit 383 of the terminal SAM firmware 161 receives the activation request. The verification processing unit 384 checks the activation password. Specifically, the password 413 which is stored in advance in the storage unit 381 is compared with the received password. When the two passwords match each other, the activating unit 390 performs activation. Then, at step S153, the transmitting unit 382 transmits a response indicating that the activation has been succeeded.

At step S124, the receiving unit 551 of the MC application 221 receives the response from the terminal SAM firmware 161. By this, the success in activation is confirmed.

At step S102, in order to activate a service application 211 that performs a payment service, the transmitting unit 302 of the upper terminal 51 transmits a command requesting to start a payment service, to the MC application 221.

At step S125, the receiving unit 551 of the MC application 221 receives the command. At step S126, the transmitting unit 552 makes a request to activate the service application 211, using an API of the terminal SAM 61.

At step S154, the receiving unit 383 of the terminal SAM firmware 161 receives the activation request. The activating unit 390 (i.e., the terminal SAM command execution service unit 194 of FIG. 6) reads the service application 211 saved in the service domain 201 of the nonvolatile memory 91, and expands the service application 211 in the service application execution area of the volatile memory 93. While the execution area for the MC application 221 is in the nonvolatile memory 92, the execution area for the service application 211 is in the volatile memory 93. By thus forming the execution areas in different memories, the occurrence of unauthorized access therebetween is prevented by the OS 171. Then, the MC application 221 is prevented from data tampering or from being corrupted by the service application 211. Furthermore, as in the case of step S85 of FIG. 17, the activating unit 390 checks the integrity of the service application 211.

When the integrity of the service application 211 is confirmed, at step S155, the transmitting unit 382 instructs the activation of the service application 211 which is specified by the activation request.

At step S181, the receiving unit 581 of the service application 211 receives the instruction. The control unit 583 performs an activation process.

At step S156, the transmitting unit 382 of the terminal SAM firmware 161 transmits a success response to the MC application 221.

At step S127, the receiving unit 551 of the MC application 221 receives the success response. By this, the success in the activation of the service application 211 is confirmed.

At step S182, the control unit 583 of the service application 211 calls an API for writing payment information into the IC card 71.

At step S157, the receiving unit 383 of the terminal SAM firmware 161 accepts the API call. The writing unit 387 performs a payment process using the API for writing into the IC card 71. Specifically, the RF of the antenna unit 62 is activated, payment information is written into the IC card 71, and payment is completed. At step S158, the transmitting unit 382 transmits a write success response.

At step S183, the receiving unit 581 of the service application 211 receives the response. At step S184, the transmitting unit 582 notifies about the completion of payment using an API.

At step S128, the receiving unit 551 of the MC application 221 receives the notification. The MC application 221 having received the notification about the completion of payment displays payment information. Specifically, to instruct to display the completion of payment on the display device 81 of the terminal SAM 61, at step S129, the transmitting unit 552 of the MC application 221 calls an SPI driver data transmission API.

At step S159, the receiving unit 383 of the terminal SAM firmware 161 accepts the SPI driver data transmission API call. The SPI driver transmits data to the display device 81 through a specified communication interface 101 (i.e., using a specified SPI port). As a result, payment information is displayed on the display device 81.

At step S160, the transmitting unit 382 of the terminal SAM firmware 161 transmits a transmission completion response.

At step S130, the receiving unit 551 of the MC application 221 receives the response.

Furthermore, to output a payment completion sound from the sound device 82 of the terminal SAM 61, at step S131, the transmitting unit 552 of the MC application 221 calls a sound driver API.

At step S161, the receiving unit 383 of the terminal SAM firmware 161 accepts the sound driver API call. The sound driver outputs specified sound data to the sound device 82. By this, a payment confirmation sound goes off through the I2S communication interface 102.

When the display and the going off of the sound are completed, at step S162, the transmitting unit 382 transmits a completion response.

At step S132, the receiving unit 551 of the MC application 221 receives the response. At step S133, the transmitting unit 552 calls an API for requesting to terminate the service application 211.

At step S163, the receiving unit 383 of the terminal firmware 161 receives the request. At step S164, the transmitting unit 382 instructs to terminate the service application 211.

At step S185, the receiving unit 581 of the service application 211 receives the instruction. The control unit 583 terminates the service application 211.

At step S134, the transmitting unit 552 of the MC application 221 transmits a payment service completion response.

At step S103, the receiving unit 303 of the upper terminal 51 receives the response, and thereby confirms the completion of the payment process.

The payment process has been described above.

[Configuration of a Payment System]

FIG. 22 is a block diagram showing a configuration of a terminal SAM client 41. As is clear from a comparison of FIG. 22 with FIG. 1, the terminal SAM client 41 is not provided with the terminal for UI control 21 of the payment system 1 of FIG. 1.

Therefore, the terminal SAM 22 of FIG. 1 has a service application 211 and performs RF control and the like, and also performs control of communication with the terminal for UI control 21. On the other hand, a terminal SAM 61 of FIG. 22 has a service application 211 and performs RF control and the like, and also performs control of communication with an upper terminal 51 and control of UI devices such as a display device 81 and a sound device 82. Thus, user's original processes which are conventionally performed by the terminal for UI control 21 can be incorporated into the terminal SAM 61.

Although the case in which the present technique is applied to a payment system is described above as an example, the present technique can be applied to other information processing systems.

[Application of the Present Technique to a Program]

The above-described series of processes can also be performed by hardware and can be performed by software.

When the series of processes are performed by software, a program composing the software is installed, from a network or a recording medium, on a computer incorporated into dedicated hardware or, for example, a general-purpose personal computer or the like, capable of performing various types of functions by installing various types of programs.

Such a recording medium including the program is not only composed of a recording medium composed of a magnetic disk (including a floppy disk), an optical disk (including a CD-ROM (Compact Disk-Read Only Memory) and a DVD), a magneto-optical disk (including an MD (Mini-Disk)), a semiconductor memory, or the like, which has the program recorded therein and which is distributed separately from the apparatus main body to provide the program to the user, but also composed of a flash ROM, a hard disk, or the like, which has the program recorded therein and which is provided to the user so as to be preinstalled on the apparatus main body.

[Others]

Note that in the present specification, the system indicates all of one or more apparatuses, each composed of a plurality of honored elements.

Note also that the network refers to a mechanism that has at least two apparatuses connected thereto and that enables transmission of information from one apparatus to another apparatus. The apparatuses that perform communication through the network may be independent apparatuses or may be internal blocks composing a single apparatus.

Note also that, for communication, not only wireless communication and wired communication, but also communication where both wireless communication and wired communication are present, that is, wireless communication is performed in a given section and wired communication is performed in other sections, may be performed. Furthermore, communication from one apparatus to another apparatus may be performed by wired communication, and communication from another apparatus to the one apparatus may be performed by wireless communication.

In the present specification, the steps described in the program which is recorded in a recording medium include not only processes that are performed chronologically in order of the steps, but also processes that are not necessarily processed chronologically but are performed parallelly or individually. The steps can be performed by different apparatuses in a shared manner, or one step can be performed by different apparatuses in a shared manner.

It should be noted that embodiments of the present technique are not limited to the above described embodiment, and various modifications may be made to it without departing from the scope of the present technique.

In addition, the present technique can also employ configurations such as those shown below.

(1)

An information processing apparatus including:

first application creating means for creating a first application that controls a device of another information processing apparatus communicating with an IC card;

first domain creating means for allowing the another information processing apparatus to create a first domain where the first application is to be registered;

first application registering means for allowing the first application to be registered in the first domain of the another information processing apparatus;

writing means for allowing the first application to be written into an execution area of the another information processing apparatus;

second application creating means for creating a second application that performs a process for the IC card;

second domain creating means for allowing the another information processing apparatus to create a second domain where the second application is to be registered; and second application registering means for allowing the second application to be registered in the second domain of the another information processing apparatus.

(2)

The information processing apparatus described in the above-described (1), in which each of commands for the creation of the first domain, the registration in the first domain, the writing into the execution area, the creation of the second domain, and the registration in the second domain is transmitted to the another information processing apparatus, as an encrypted package.

(3)

The information processing apparatus described in the above-described (1) or (2), in which the writing means allows the first application to be written into the execution area for the first application formed in a different memory than a memory where an execution area for the second application is formed.

(4)

The information processing apparatus described in the above-described (1), (2), or (3) that further includes validating means for validating the first application.

(5)

The information processing apparatus described in the above-described (4), in which in a case of the first application validated, the first application is activated when the another information processing apparatus is activated.

(6)

The information processing apparatus described in any of the above-described (1) to (5), in which the first application has a higher priority than firmware of the another information processing apparatus.

(7)

The information processing apparatus described in any of the above-described (1) to (6), in which the information processing apparatus is a POS terminal, and the another information processing apparatus is an IC card reader/writer.

(8)

An information processing method including:

a first application creation step of creating a first application that controls a device of another information processing apparatus communicating with an IC card;

a first domain creation step of allowing the another information processing apparatus to create a first domain where the first application is to be registered;

a first application registration step of allowing the first application to be registered in the first domain of the another information processing apparatus;

a writing step of allowing the first application to be written into an execution area of the another information processing apparatus;

a second application creation step of creating a second application that performs a process for the IC card;

a second domain creation step of allowing the another information processing apparatus to create a second domain where the second application is to be registered; and a second application registration step of allowing the second application to be registered in the second domain of the another information processing apparatus.

(9)

A program causing a computer to perform:

a first application creation step of creating a first application that controls a device of another information processing apparatus communicating with an IC card;

a first domain creation step of allowing the another information processing apparatus to create a first domain where the first application is to be registered;

a first application registration step of allowing the first application to be registered in the first domain of the another information processing apparatus;

a writing step of allowing the first application to be written into an execution area of the another information processing apparatus;

a second application creation step of creating a second application that performs a process for the IC card;

a second domain creation step of allowing the another information processing apparatus to create a second domain where the second application is to be registered; and a second application registration step of allowing the second application to be registered in the second domain of the another information processing apparatus.

(10)

An information processing apparatus including:

first domain creating means for creating a first domain where a first application is to be registered, based on an instruction from another information processing apparatus, the first application controlling a device;

first application registering means for registering the first application in the first domain, based on an instruction from the another information processing apparatus, the first application being received from the another information processing apparatus;

writing means for writing the first application into an execution area, based on an instruction from the another information processing apparatus;

second domain creating means for creating a second domain where a second application is to be registered, based on an instruction from the another information processing apparatus, the second application performing a process for an IC card; and second application registering means for registering the second application in the second domain, based on an instruction from the another information processing apparatus, the second application being received from the another information processing apparatus.

(11)

The information processing apparatus described in the above-described (10), in which the writing means writes the first application into the execution area for the first application formed in a different memory than a memory where an execution area for the second application is formed.

(12)

The information processing apparatus described in the above-described (10) or (11) that further includes storage means for storing validation information indicating that the first application has been validated by the another information processing apparatus, in which when the first application is validated, the first application is activated when the information processing apparatus is activated.

(13)

The information processing apparatus described in the above-described (10), (11), or (12), in which the first application has a higher priority than firmware of the information processing apparatus.

(14)

The information processing apparatus described in any of the above-described (10) to (13), in which the information processing apparatus is an IC card reader/writer, and the another information processing apparatus is a POS terminal.

(15) An information processing method for an information processing apparatus, the method including:

a first domain creation step of creating a first domain where a first application is to be registered, based on an instruction from another information processing apparatus, the first application controlling a device;

a first application registration step of registering the first application in the first domain, based on an instruction from the another information processing apparatus, the first application being received from the another information processing apparatus;

a writing step of writing the first application into an execution area, based on an instruction from the another information processing apparatus;

a second domain creation step of creating a second domain where a second application is to be registered, based on an instruction from the another information processing apparatus, the second application performing a process for an IC card; and a second application registration step of registering the second application in the second domain, based on an instruction from the another information processing apparatus, the second application being received from the another information processing apparatus.

(16) A program causing a computer controlling operation of an information processing apparatus to perform:

a first domain creation step of creating a first domain where a first application is to be registered, based on an instruction from another information processing apparatus, the first application controlling a device;

a first application registration step of registering the first application in the first domain, based on an instruction from the another information processing apparatus, the first application being received from the another information processing apparatus;

a writing step of writing the first application into an execution area, based on an instruction from the another information processing apparatus;

a second domain creation step of creating a second domain where a second application is to be registered, based on an instruction from the another information processing apparatus, the second application performing a process for an IC card; and a second application registration step of registering the second application in the second domain, based on an instruction from the another information processing apparatus, the second application being received from the another information processing apparatus.

REFERENCE SIGNS LIST 31 information processing system, 41-1 to 41-3 terminal SAM client, 42 network, 43 approval apparatus, 44-1 to 44-3 server, 45 key server, 51 upper terminal, 52 payment terminal, 61 terminal SAM, 62 antenna unit, 71 IC card, 91 and 92 nonvolatile memory, 93 volatile memory

The invention claimed is:

1. An information processing apparatus comprising:
first application creating means for creating a module controller application that controls a device of another information processing apparatus, wherein the other information processing apparatus communicates with an IC card;

an interface for communicating commands to the other information processing apparatus;

first domain creating means for sending a domain creating command to the other information processing apparatus, via the interface, to create a first domain in a memory of the other information processing apparatus where the module controller application is to be registered;

first application registering means for sending a registration command to the other information processing apparatus to enable the module controller application to be registered in the first domain of the memory of the other information processing apparatus;

writing means for sending a write command to the other information processing apparatus to write the module controller application into an execution area of a store of the other information processing apparatus;

second application creating means for creating a service application that reads and writes information to the IC card, the service application having a lower priority than the first application;

second domain creating means for sending a second domain creating command to the other information processing apparatus, via the interface, to create a second domain in the memory where the service application is to be registered; and second application registering means for sending a second registration command to the other information processing apparatus to enable the service application to be registered in the second domain of the memory of the other information processing apparatus.

2. The information processing apparatus according to claim 1, wherein respective commands for the creation of the first domain, the registration in the first domain, the writing into the execution area, the creation of the second domain, and the registration in the second domain are transmitted to the other information processing apparatus, as an encrypted package.

3. The information processing apparatus according to claim 2, wherein the write command writes the module controller application into an execution area that is formed in a different memory than a memory in which an execution area for the service application is formed.

4. The information processing apparatus according to claim 3, further comprising validating means for validating the module controller application.

5. The information processing apparatus according to claim 4, wherein when the module controller application is validated, the module controller application is activated when the other information processing apparatus is activated.

6. The information processing apparatus according to claim 5, wherein the module controller application has a higher priority than firmware of the other information processing apparatus.

7. The information processing apparatus according to claim 6, wherein
the information processing apparatus is a POS terminal, and
the other information processing apparatus is an IC card reader/writer.

8. An information processing method comprising:
creating a module controller application that controls a device of another information processing apparatus, wherein the other information processing apparatus communicates with an IC card;

instructing the other information processing apparatus to create a first domain in a memory of the other information processing apparatus where the module controller application is to be registered;
enabling the module controller application to be registered in the first domain of the memory of the other information processing apparatus;
writing the module controller application into an execution area of a store of the other information processing apparatus;
creating a service application that reads and writes information to the IC card, the service application having a lower priority than the module controller application;
instructing the other information processing apparatus to create a second domain in the memory where the service application is to be registered; and
enabling the service application to be registered in the second domain of the memory of the other information processing apparatus.

9. A program stored on a non-transitory medium causing a computer to perform the method comprising:
creating a module controller application that controls a device of another information processing apparatus, wherein the other information processing apparatus communicates with an IC card;
instructing the other information processing apparatus to create a first domain in a memory of the other information processing apparatus where the module controller application is to be registered;
enabling the module controller application to be registered in the first domain of the memory of the other information processing apparatus;
writing the module controller application into an execution area of a store of the other information processing apparatus;
creating a service application that reads and writes information to the IC card, the service application having a lower priority than the module controller application;
instructing the other information processing apparatus to create a second domain in the memory where the service application is to be registered; and
enabling the service application to be registered in the second domain of the memory of the other information processing apparatus.

10. An information processing apparatus comprising:
an interface for receiving instructions from another information processing apparatus;
first domain creating means for receiving a first domain creating instruction from the other information processing apparatus, via the interface, to create a first domain in a memory of the information processing apparatus where a module controller application is to be registered, wherein the module controller application controls a device;
first application registering means for receiving from the other information processing apparatus an instruction to register the module controller application in the first domain of the memory, the module controller application being received from the other information processing apparatus;
writing means for receiving from the other information processing apparatus an instruction to write the module controller application into an execution area of a store of the information processing apparatus;
second domain creating means for receiving from the other information processing apparatus a second domain creating instruction to create a second domain in the memory where a service application is to be registered, the service application reading and writing information to an IC card, and the service application having a lower priority than the module controller application; and
second application registering means for receiving from the other information processing apparatus an instruction to register the service application in the second domain of the memory, the service application being received from the other information processing apparatus.

11. The information processing apparatus according to claim 10, wherein the writing means writes the module controller application into an execution area that is formed in a different memory than a memory in which an execution area for the service application is formed.

12. The information processing apparatus according to claim 11, wherein the store stores validation information indicating that the module controller application has been validated by the other information processing apparatus, wherein when the module controller application is validated, the module controller application is activated when the information processing apparatus is activated.

13. The information processing apparatus according to claim 12, wherein the module controller application has a higher priority than firmware of the information processing apparatus.

14. The information processing apparatus according to claim 13, wherein
the information processing apparatus is an IC card reader/writer, and
the other information processing apparatus is a POS terminal.

15. An information processing method for an information processing apparatus, the method comprising:
creating a first domain in a memory of the information processing apparatus where a module controller application is to be registered, based on an instruction from another information processing apparatus, wherein the module controller application controls a device;
registering the module controller application in the first domain of the memory, based on an instruction from the other information processing apparatus, the module controller application being received from the other information processing apparatus;
writing the module controller application in an execution area of a store of the information processing apparatus, based on an instruction from the other information processing apparatus;
creating a second domain where a service application is to be registered, based on an instruction from the other information processing apparatus, the service application reading and writing information to an IC card, and the service application having a lower priority than the module controller application; and
registering the service application in the second domain in the memory, based on an instruction from the other information processing apparatus, the service application being received from the other information processing apparatus.

16. A program stored on a non-transitory medium causing a computer to control the operation of an information processing apparatus to perform the method comprising:
creating a first domain in a memory of the information processing apparatus where a module controller application is to be registered, based on an instruction from another information processing apparatus, wherein the module controller application controls a device;

registering the module controller application in the first domain of the memory, based on an instruction from the other information processing apparatus, the module controller application being received from the other information processing apparatus;

writing the module controller application into an execution area of a store of the information processing apparatus, based on an instruction from the other information processing apparatus;

creating a second domain where a service application is to be registered, based on an instruction from the other information processing apparatus, the service application reading and writing information to an IC card, and the service application having a lower priority than the module controller application; and registering the service application in the second domain in the memory, based on an instruction from the other information processing apparatus, the service application being received from the other information processing apparatus.

* * * * *